US012236783B2

(12) United States Patent
Li

(10) Patent No.: US 12,236,783 B2
(45) Date of Patent: Feb. 25, 2025

(54) IMPLEMENTATION METHOD AND SYSTEM FOR ROAD TRAFFIC RESERVATION PASSAGE, AND ELECTRONIC DEVICE

(71) Applicant: IE-CHENG TECHNOLOGY (TIANJIN) CO., LTD., Tianjin (CN)

(72) Inventor: Chunming Li, Tianjin (CN)

(73) Assignee: IE-CHENG TECHNOLOGY (TIANJIN) CO., LTD., Tianjin (CN)

( * ) Notice: Subject to any disclaimer, the term of this patent is extended or adjusted under 35 U.S.C. 154(b) by 282 days.

(21) Appl. No.: 18/007,449

(22) PCT Filed: Aug. 11, 2020

(86) PCT No.: PCT/CN2020/108488
§ 371 (c)(1),
(2) Date: Jan. 30, 2023

(87) PCT Pub. No.: WO2022/021475
PCT Pub. Date: Feb. 3, 2022

(65) Prior Publication Data
US 2023/0282104 A1 Sep. 7, 2023

(30) Foreign Application Priority Data
Jul. 31, 2020 (CN) ........................ 202010754355.5

(51) Int. Cl.
*G08G 1/081* (2006.01)
*G08G 1/01* (2006.01)
(Continued)

(52) U.S. Cl.
CPC ........... *G08G 1/081* (2013.01); *G08G 1/0125* (2013.01); *G08G 1/0133* (2013.01); *G08G 1/08* (2013.01); *G08G 1/0967* (2013.01)

(58) Field of Classification Search
None
See application file for complete search history.

(56) References Cited

U.S. PATENT DOCUMENTS 9,707,960 B2 7/2017 Gutmann et al.
10,005,460 B2 6/2018 Gutmann et al.
(Continued)

FOREIGN PATENT DOCUMENTS

CN 101702262 5/2010
CN 104916142 9/2015
(Continued)

OTHER PUBLICATIONS

Partial English Abstract for CN 110085037 published on Aug. 2, 2019.
(Continued)

*Primary Examiner* — Peter D Nolan
*Assistant Examiner* — Michael F Whalen
(74) *Attorney, Agent, or Firm* — DLA Piper LLP (US)

(57) ABSTRACT

Provided are implementation method and system for road traffic reservation passage, and electronic device. The method includes: determining path reservation speed curve according to path planning information of vehicle, which includes driving data of the vehicle passing through intersection in planned path; the vehicle sending the path reservation speed curve to traffic scheduling center; the traffic scheduling center classifying the received path reservation speed curve according to intersection information to obtain the classification result, and sending it to signal control calculation unit of the corresponding intersection; the signal control calculation unit determining intersection signal lamp timing scheme and vehicle speed guide data according to the classification result and sending same to the vehicle; the vehicle determining driving speed control curve according to the received intersection signal lamp timing scheme and the vehicle speed guide data, and guiding the passing of the vehicle according to the driving speed control curve.

15 Claims, 6 Drawing Sheets

(51) Int. Cl.
*G08G 1/08* (2006.01)
*G08G 1/0967* (2006.01)

(56) References Cited

U.S. PATENT DOCUMENTS

| | | | |
|---|---|---|---|
| 10,377,378 B2 | 8/2019 | Gutmann et al. | |
| 2016/0035223 A1 | 2/2016 | Gutmann et al. | |
| 2017/0341643 A1 | 11/2017 | Gutmann et al. | |
| 2018/0265082 A1 | 9/2018 | Gutmann et al. | |
| 2019/0351897 A1 | 11/2019 | Gutmann et al. | |

FOREIGN PATENT DOCUMENTS

| | | | |
|---|---|---|---|
| CN | 107331182 | 11/2017 | |
| CN | 107742433 | 2/2018 | |
| CN | 107945540 | 4/2018 | |
| CN | 109035781 | 12/2018 | |
| CN | 109035832 | 12/2018 | |
| CN | 109045832 | 12/2018 | |
| CN | 110085037 | 8/2019 | |
| CN | 110085037 B * | 9/2021 | ............ G08C 17/02 |
| WO | WO-2017217377 A1 * | 12/2017 | .............. G08G 1/07 |

OTHER PUBLICATIONS

Partial English Abstract for CN 109035832 published on Dec. 18, 2018.
Partial English Abstract for CN 109035781 published on Dec. 18, 2018.
Partial English Abstract for CN 107945540 published on Apr. 20, 2018.
Partial English Abstract for CN 104916142 published on Sep. 16, 2015.
Partial English Abstract for CN 101702262 published on May 5, 2010.
Partial English Abstract for CN 107331182 published on Nov. 7, 2017.
Partial English Abstract for CN 109045832 published on Dec. 21, 2018.
Partial English Abstract for CN 107742433 published on Feb. 27, 2018.
International Search Report cited in application No. PCT/CN2020/108488 dated Apr. 29, 2021.

* cited by examiner

IMPLEMENTATION METHOD AND SYSTEM FOR ROAD TRAFFIC RESERVATION PASSAGE, AND ELECTRONIC DEVICE

CROSS-REFERENCE TO RELEVANT APPLICATIONS

This application is a U.S. National Stage Application of International Application No. PCT/CN2020/108488 filed Aug. 11, 2020, and the title of "IMPLEMENTATION METHOD AND SYSTEM FOR ROAD TRAFFIC RESERVATION PASSAGE, AND ELECTRONIC DEVICES" which claims priority from Chinese Patent Application No. 202010754355.5 filed Jul. 31, 2020. The entirety of all the above-listed applications are incorporated herein by reference.

TECHNICAL FIELD

The present disclosure relates to the field of road traffic technology, and more particularly, to a method, a system, and electronic devices for implementing road traffic reservation passage.

BACKGROUND ART

The existing traffic signal control system adopts a method of a fixed period or a variable period to control the traffic flow at the intersection, wherein the fixed period control method is a control scheme generated according to the results of statistical analysis of historical data; and the variable period control method performs the calculation and offers the corresponding control scheme according to the position data through sensors/video detections and real-time reporting of the vehicle, the main goal of which is to optimize the passing efficiency of intersections. With the increasing number of vehicles on the road, controlling the vehicles by the traffic signal control system in the prior art can hardly satisfy the increasingly congested road conditions. Therefore, in order to accurately satisfy the passing needs of users, which is to fully utilize the time and space resources of the road network, to achieve a safe, orderly, energy-saving, and efficient traffic mode, a more efficient method of road traffic reservation passage is required.

SUMMARY

In view of this, the purpose of the present disclosure is to provide a method, a system and electronic devices for implementing road traffic reservation passage, in which time and space resources of intersections are allocated on demands, which can improve the control effect of the traffic signal control system and improve the passing efficiency of vehicles, and it is conducive to reducing energy consumption.

In the first aspect, a method for implementing road traffic reservation passage is provided by an embodiment of the present disclosure, and the method includes:

- determining a route reservation speed curve according to the route planning information of a vehicle, and the route reservation speed curve is sent to a traffic dispatch center by the vehicle, wherein the route reservation speed curve includes a lane where the vehicle passes an intersection in a planned route, an arrival time, a speed and a current positional datum;
- obtaining a classification result by classifying based on intersection information by the traffic dispatch center according to the route reservation speed curve that is received, and sending the classification result to a signal control calculation unit of a corresponding intersection;
- determining a timing scheme for intersection signal lights and vehicle speed guidance data by the signal control calculation unit according to the classification result that is received, and sending the timing scheme for intersection signal lights and the vehicle speed guidance data to the vehicle; and
- determining a driving speed control curve by the vehicle according to the timing scheme for intersection signal lights and the vehicle speed guidance data that are received, and guiding a passage of the vehicle according to the driving speed control curve.

In some embodiments, the above method further includes:

- sending the timing scheme for intersection signal lights to a signal machine of the corresponding intersection; and
- controlling durations of the intersection signal lights according to the timing scheme for intersection signal lights that is received, to guide passages of all vehicles passing through the intersection by the signal machine.

In some embodiments, determining a route reservation speed curve according to route planning information of a vehicle includes:

- determining a plurality of route planning schemes according to a starting time, a departure place, and a destination of the vehicle, obtaining a route planning scheme that satisfies a preset condition from a plurality of the route planning schemes; and
- obtaining the time that the vehicle arrives at every intersection along a lane and the time that the vehicle arrives at the destination by calculating, and generating the route reservation speed curve according to, in the route planning information, speed limit values between each of the intersections along the lane, an average vehicle speed between each of the intersections along the lane, the starting time of the vehicle and a preset driving speed of the vehicle.

In some embodiments, the vehicle speed guidance data include:

- one or more of a departure place, a destination, a driving direction and a driving speed of the vehicle, positions at each time, information of the lane and time of arrival of each intersection; and
- different vehicles in lane guidance data are required to satisfy a preset time interval when passing through the same position.

In some embodiments, determining a driving speed control curve by the vehicle according to the timing scheme for intersection signal lights and the vehicle speed guidance data that are received includes:

- real-time receiving the timing scheme for intersection signal lights and the vehicle speed guidance data by the vehicle;
- determining real-time planning information of the vehicle according to the timing scheme for intersection signal lights and the vehicle speed guidance data, wherein the real-time planning information includes route planning data of the vehicle under timing schemes at each intersection; and
- generating the driving speed control curve according to the current driving lane number of the vehicle, the time that the vehicle arrives at each intersection, the driving speeds that the vehicle arrives at each intersection and durations of the timing of signal lights at each intersection in the real-time planning information.

In some embodiments, the guiding a passage of the vehicle according to the driving speed control curve includes:

acquiring the vehicle speed guidance data at each intersection and light-timing schemes when the vehicle passes through each intersection in the driving speed control curve; and inputting the vehicle speed guidance data and the light-timing schemes when the vehicle passes through each intersection to a navigation system and/or an automatic driving system of the vehicle, and controlling the vehicle to drive according to the driving speed control curve.

In some embodiments, after determining the driving speed control curve as mentioned above, the method further includes:

performing a recalculation to the driving speed control curve according to a preset time threshold, to obtain a temporary result; and maintaining the current driving speed control curve when the temporary result is consistent with the driving speed control curve; and re-executing the method for implementing road traffic reservation passage according to a current position and a target position of the vehicle when the temporary result is not consistent with the driving speed control curve.

In some embodiments, determining a timing scheme for intersection signal lights and vehicle speed guidance data by the signal control calculation unit according to the classification result that is received as mentioned above includes:

acquiring channelization information of an intersection corresponding to the signal control calculation unit;

generating a signal light timing scheme of the intersection by calculating according to the channelization information of the intersection and reservation data of all vehicles at the intersection; and determining a time that the vehicle arrives at the intersection, a speed and a lane assignment result and using them as the vehicle speed guidance data according to the channelization information of the intersection, the signal light timing scheme of the intersection, and the reservation data of all vehicles at the intersection.

In some embodiments, determining the time that the vehicle arrives at the intersection, a speed and a lane assignment result and using them as the vehicle speed guidance data according to the channelization information of the intersection, the signal light timing scheme of the intersection and the reservation data of all vehicles at the intersection as mentioned above includes:

performing grouping in sequence to all requests in the classification result according to driving directions of the vehicle and times, to obtain a grouping result according to the channelization information;

calculating the time that the vehicle arrives at the intersection according to a sequence order in the classification result, performing classification and aggregation to the above data according to directions of driving in and driving out of the intersection of the vehicle, and generating a timing scheme for the intersection signal lights accordingly; and determining green light periods of each lane according to the timing scheme for intersection signal lights, and distributing uniformly the reservation information to the green light periods corresponding to lanes with the directions nearby according to the reservation information of vehicles.

In some embodiments, the above method is applied to fixed conflict points and mobile conflict points;

wherein the fixed conflict points include one or more of: intersections with signal lights, intersections without signal lights, highway entrances and exits, urban expressway entrances and exits, overpass entrances and exits and a conflux point;

the mobile conflict points are side-by-side regions on either side of a lane where a low-speed vehicle is located, which move along with the low-speed vehicles; and the low-speed vehicle is a vehicle whose speed is lower than the average speed of a traffic flow on the lane where it is located, and the time of arriving at the conflict points is calculated according to a principle of subtracting the same directional speed or adding an opposite directional speed.

In some embodiments, a process of determining the timing scheme for intersection signal lights and the vehicle speed guidance data when the number of reserved vehicles reaches a passage capacity limit of a road as mentioned above includes:

identifying the road that reaches the passage capacity limit and marking it as a congested lane section;

performing an updating of route planning information to subsequent reserved vehicles according to a principle of avoiding the congested lane section; and determining timing schemes for intersection signal lights and vehicle speed guidance data for the subsequent reserved vehicles according to the route planning information that is updated.

In some embodiments, the step of determining a driving speed control curve by the vehicle according to the timing scheme for intersection signal lights and the vehicle speed guidance data that are received, and guiding a passage of the vehicle according to the driving speed control curve as mentioned above includes:

generating a standard speed control curve under a present driving route of the vehicle according to the timing scheme for intersection signal lights and driving lane numbers of each intersection in the present driving route of the vehicle, times of arriving at the intersections, driving speeds of arriving at the intersections and signal light timing schemes when the vehicle arrives at the intersections in the vehicle speed guidance data;

generating a real-time speed control curve according to the standard speed control curve during a driving process of the vehicle, the real-time speed control curve is configured for adjusting the error caused by control accuracy limitations or external disturbances in a practical driving process, and performing a speed compensation that is required;

determining the standard speed control curve and the real-time speed control curve as the driving speed control curve; driving according to the real-time control speed curve when a speed value of the real-time control speed curve does not exceed a preset speed threshold; and re-executing the method for implementing road traffic reservation passage according to the current time, speed, position, and target position of the vehicle when it exceeds the preset speed threshold.

In some embodiments, guiding a passage of the vehicle according to the driving speed control curve as mentioned above includes:

simulating and displaying an icon of a current vehicle by the vehicle according to the current position and the driving speed in the real-time speed control curve;

displaying an icon of a guiding vehicle that simulates driving according to the standard speed control curve at the same time; and deciding to accelerate, decelerate or maintain the speed by the driver of the vehicle according to the relative position between the icon of the current vehicle and the icon of the guiding vehicle and the real-time speed control curve; and a sound or image prompting of accelerating, decelerating or maintaining the speed is also capable to be generated.

In the second aspect, a system for implementing road traffic reservation passage is provided by an embodiment of the present disclosure, and the system includes:

an initialization module, configured for determining a route reservation speed curve according to the route planning information of a vehicle, and the route reservation speed curve is sent to a traffic dispatch center by the vehicle, wherein the route reservation speed curve includes a lane where the vehicle passes an intersection in a planned route, an arrival time, a speed and a current positional datum;

a first calculation module, configured for obtaining a classification result by classifying based on intersection information by the traffic dispatch center according to the route reservation speed curve that is received, and sending the classification result to a signal control calculation unit of a corresponding intersection;

a second calculation module, configured for determining a timing scheme for intersection signal lights and vehicle speed guidance data by the signal control calculation unit according to the classification result that is received, and sending the timing scheme for intersection signal lights and the vehicle speed guidance data to the vehicle; and a reservation control module, configured for determining a driving speed control curve by the vehicle according to the timing scheme for intersection signal lights and the vehicle speed guidance data that are received, and guiding a passage of the vehicle according to the driving speed control curve.

In some embodiments, the system as mentioned above further includes:

a signal machine data receiving module, configured for sending the timing scheme for intersection signal lights to a signal machine of the corresponding intersection; and a signal machine controlling module, configured for controlling durations of the intersection signal lights according to the timing scheme for intersection signal lights that is received by the signal machine, to guide passages of all vehicles passing through the intersection.

In some embodiments, the initialization module as mentioned above further includes:

a route planning scheme determination module, configured for determining a plurality of route planning schemes according to a starting time, a departure place and a destination of the vehicle, obtaining a route planning scheme that satisfies a preset condition from a plurality of the route planning schemes; and a route reservation speed curve generation module, configured for obtaining the time that the vehicle arrives at every intersection along a lane and the time that the vehicle arrives at the destination by calculating, and generating the route reservation speed curve according to, in the route planning information, speed limit values between each of the intersections along the lane, an average vehicle speed between each of the intersections along the lane, the starting time of the vehicle and a preset driving speed of the vehicle.

In some embodiments, the vehicle speed guidance data includes: one or more of a departure place, a destination, a driving direction and a driving speed of the vehicle, positions at each time, information of the lane and the time of arrival at each intersection; and different vehicles in lane guidance data are required to satisfy a preset time interval when passing through the same position.

In some embodiments, the reservation control module as mentioned above further includes:

a vehicle data receiving module, configured for real-time receiving the timing scheme for intersection signal lights and the vehicle speed guidance data by the vehicle;

a real-time planning information determination module, configured for determining real-time planning information of the vehicle according to the timing scheme for intersection signal lights and the vehicle speed guidance data, wherein the real-time planning information includes route planning data of the vehicle under timing schemes at each intersection; and a driving speed control curve generation module, configured for generating the driving speed control curve according to the current driving lane number of the vehicle, the time that the vehicle arrives at each intersection, the driving speeds that the vehicle arrives at each intersection, and durations of the timing of signal lights at each intersection in the real-time planning information.

In some embodiments, the reservation control module as mentioned above further includes:

a driving speed control data acquisition module, configured for acquiring the vehicle speed guidance data at each intersection and light-timing schemes when the vehicle passes through each intersection in the driving speed control curve; and a driving control module, configured for inputting the vehicle speed guidance data and the light-timing schemes when the vehicle passes through each intersection to a navigation system and/or an automatic driving system of the vehicle, and controlling the vehicle to drive according to the driving speed control curve.

In some embodiments, the system as mentioned above further includes:

a temporary result acquisition module, configured for performing a recalculation to the driving speed control curve according to a preset time threshold, to obtain a temporary result;

a temporary result determination module, configured for maintaining the current driving speed control curve when the temporary result is consistent with the driving speed control curve; and re-executing the method for implementing road traffic reservation passage according to a current position and a target position of the vehicle when the temporary result is not consistent with the driving speed control curve.

In some embodiments, the second calculation module as mentioned above further includes:

a channelization information acquisition module, configured for acquiring channelization information of an intersection corresponding to the signal control calculation unit;

a signal light timing scheme generation module, configured for generating a signal light timing scheme of the intersection by calculating according to the channelization information of the intersection and reservation data of all vehicles at the intersection; and a vehicle speed guidance data generation module, configured for determining the time that the vehicle arrives at the intersection, a speed, and a lane assignment result and using them as the vehicle speed guidance data according to the channelization information of the intersection, the signal light timing scheme of the intersection and the reservation data of all vehicles at the intersection.

In some embodiments, the vehicle speed guidance data generation module as mentioned above further includes:

a channelization information grouping module, configured for performing grouping in sequence to all requests in the classification result according to the driving directions of the vehicle and times, to obtain a grouping result according to the channelization information;

a signal light timing scheme generation module, configured for calculating the time that the vehicle arrives at the intersection according to a sequence order in the classification result, performing classification and aggregation to the above data according to directions of driving in and driving out the intersection of the vehicle, and generating a timing scheme for the intersection signal lights accordingly; and a vehicle speed guidance data generation module, configured for determining green light periods of each lane according to the timing scheme for intersection signal lights, and distributing uniformly the reservation information to the green light periods corresponding to lanes with the directions nearby according to the reservation information of vehicles.

In some embodiments, the system as mentioned above is applied to fixed conflict points and mobile conflict points, wherein the fixed conflict points include one or more of: intersections with signal lights, intersections without signal lights, highway entrances and exits, urban expressway entrances and exits, overpass entrances and exits, and a conflux point; and the mobile conflict points are side-by-side regions on either side of a lane where a low-speed vehicle is located and follows the low-speed vehicles to move; and the low-speed vehicle is a vehicle whose speed is lower than the average speed of the traffic flow on the lane where it is located, and the time of arriving at the conflict points is calculated according to a principle of subtracting the same directional speed or adding an opposite directional speed.

In some embodiments, when the number of reserved vehicles reaches a passage capacity limit of a road, the second calculation module as mentioned above further includes:

a congested lane section marking module, configured for acquiring the road that reaches the passage capacity limit and recording it as a congested lane section;

a route planning information updating module, configured for performing an updating of route planning information to subsequent reserved vehicles according to a principle of avoiding the congested lane section; and a data updating module, configured for determining timing schemes for intersection signal lights and vehicle speed guidance data for the subsequent reserved vehicles according to the route planning information that is updated.

In some embodiments, the reservation control module as mentioned above further includes:

a standard speed control curve generation module, configured for generating a standard speed control curve under the present driving route of the vehicle according to the timing scheme for intersection signal lights and driving lane numbers of each intersection in the present driving route of the vehicle, time of arriving at the intersections, driving speeds of arriving at the intersections and signal light timing schemes when the vehicle arrives at the intersections in the vehicle speed guidance data;

a real-time speed control curve generation module, configured for generating a real-time speed control curve according to the standard speed control curve during the driving process of the vehicle, wherein the real-time speed control curve is configured for adjusting a control error caused by accuracy limitations or external disturbances in a practical driving process, and performing a speed compensation that is required; and a driving speed control curve generation module, configured for determining the standard speed control curve and the real-time speed control curve as the driving speed control curve; driving according to the real-time control speed curve when a speed value of the real-time control speed curve does not exceed a preset speed threshold; and re-executing the method for implementing road traffic reservation passage according to the current time, speed, position, and target position of the vehicle when it exceeds the preset speed threshold.

In some embodiments, the reservation control module as mentioned above further includes:

a vehicle simulation and calculation module, configured for simulating and displaying an icon of a current vehicle according to the current position and the driving speed in the real-time speed control curve; and displaying an icon of a guiding vehicle that simulates driving according to the standard speed control curve at the same time;

a prompting module, configured for deciding to accelerate, decelerate or maintain the speed by the driver of the vehicle according to a relative position between the icon of the current vehicle and the icon of the guiding vehicle and the real-time speed control curve; and a sound or image prompting of accelerating, decelerating or maintaining the speed is also capable to be generated.

In the third aspect, an electronic device is provided by an embodiment of the present disclosure, including: a processor and a storage apparatus; a computer program is stored on the storage apparatus, and when the computer program is run by the processor, steps of the method for implementing road traffic reservation passage according to any of the embodiments in the first aspect are executed.

In the fourth aspect, a computer-readable storage medium is provided by an embodiment of the present disclosure, a computer program is stored on the computer-readable storage medium, when the computer program is run by a processor, steps of the method for implementing road traffic reservation passage according to any of the embodiments in the first aspect are executed.

A method, a system and electronic devices for implementing road traffic reservation passage are provided by the embodiments of the present disclosure. In the method, the route reservation speed curve is determined according to route planning information of a vehicle, wherein the route reservation speed curve includes a lane where the vehicle passes an intersection in a planned route, an arrival time, a speed and a current positional datum; then, the route reservation speed curve is sent to a traffic dispatch center by the vehicle; a classification result is obtained based on intersection information by the traffic dispatch center according to the route reservation speed curve that is received, and the classification result is sent to a signal control calculation unit of a corresponding intersection; a timing scheme for intersection signal lights and vehicle speed guidance data are determined by the signal control calculation unit according to the classification result that is received, and the timing scheme for intersection signal lights and the vehicle speed guidance data are sent to the vehicle; a driving speed control curve is determined by the vehicle according to the timing scheme for intersection signal lights and the vehicle speed guidance data that are received, and a passage of the vehicle is guided according to the driving speed control curve. In the implementation process of road traffic reservation passage, the requirement of each user is acquired accurately in a way of reservation, it can be planned in advance and accurately guided according to intersections and channelization directions of the intersections, the implementation process is reasonable and smooth with the strict logic, and the time and space resources of intersections are allocated on demands, which can improve the control effect of the traffic signal control system, improve the passing efficiency of vehicles and reduce the waiting time of the vehicles, and it is conducive to reducing energy consumption.

Other features and advantages of the present disclosure will be described in the subsequent description, and part of them become apparent from the description, or can be understood according to the embodiments of the present disclosure. The purpose and other advantages of the present disclosure are realized and obtained in the structures specified in the specification, the claims, and the figures.

In order to make the above-mentioned purposes, characteristics, and advantages of the present disclosure more apparent and understandable, preferable embodiments are illustrated in the following content and described specifically in combination with the accompanying figures.

BRIEF DESCRIPTION OF DRAWINGS

In order to more clearly explain the technical solution in the embodiments of the present disclosure, the following content will be used to briefly introduce the drawings illustrated in the embodiments, it should be understood that the following drawings only illustrate some embodiments of the present disclosure and should not be regarded as a limitation of the scope, for ordinary people skilled in the art, they can also obtain other relevant drawings according to these drawings without any creative work.

REFERENCE SIGNS

210—initialization module; 220—first calculation module; 230—second calculation module; 240—reservation control module; 1—vehicle terminal; 2—server terminal; 3—signal machine; 11—route planning module; 12—route reservation speed curve generation module; 13—reservation request reporting module; 14—driving speed control curve generation module; 15—correction request reporting module; 16—reservation cancellation request reporting module; 121—information data input unit; 21—dispatch center; 22—signal control calculation unit; 23—signal light timing scheme generation module; 24—vehicle speed guidance data generation module; 101—processor; 102—memory; 103—bus; 104—communication interface.

DETAILED DESCRIPTION OF EMBODIMENTS

The following will clearly and completely describe the technical solutions of the present disclosure in combination with the embodiments. Obviously, the described embodiments are part of the embodiments of the present disclosure, not all embodiments. Based on the embodiments in the present disclosure, all other embodiments obtained by ordinary people skilled in this field without creative work belong to the scope of protection of the present disclosure.

The existing traffic signal control system adopts a method of a fixed period or a variable period to control the traffic flow at the intersection, wherein the fixed period control method is a control scheme generated according to the results of statistical analysis of historical data; and the variable period control method performs the calculation and offers the corresponding control scheme according to the position data through sensors/video detections and real-time reporting of the vehicle, the main goal of which is to optimize the passing efficiency at intersections. With the increasing number of vehicles on the road, the signal control technology in the prior art can hardly satisfy the increasingly congested road conditions. Therefore, in order to satisfy the passing needs of users, which is to fully utilize the time and space resources of the road network, to achieve a safe, orderly, energy-saving, and efficient traffic mode, a more efficient method of road traffic reservation passage is required.

In view of this, a method, a system, and electronic devices for implementing road traffic reservation passage are provided by the embodiments of the present disclosure, which can improve the control effect of the traffic signal control system and improve the passing efficiency of vehicles, and it is conducive to reducing energy consumption.

In order to facilitate the understanding of the present embodiment, the embodiment of the present disclosure is described in detail as follows.

Embodiment I

Figure 1:
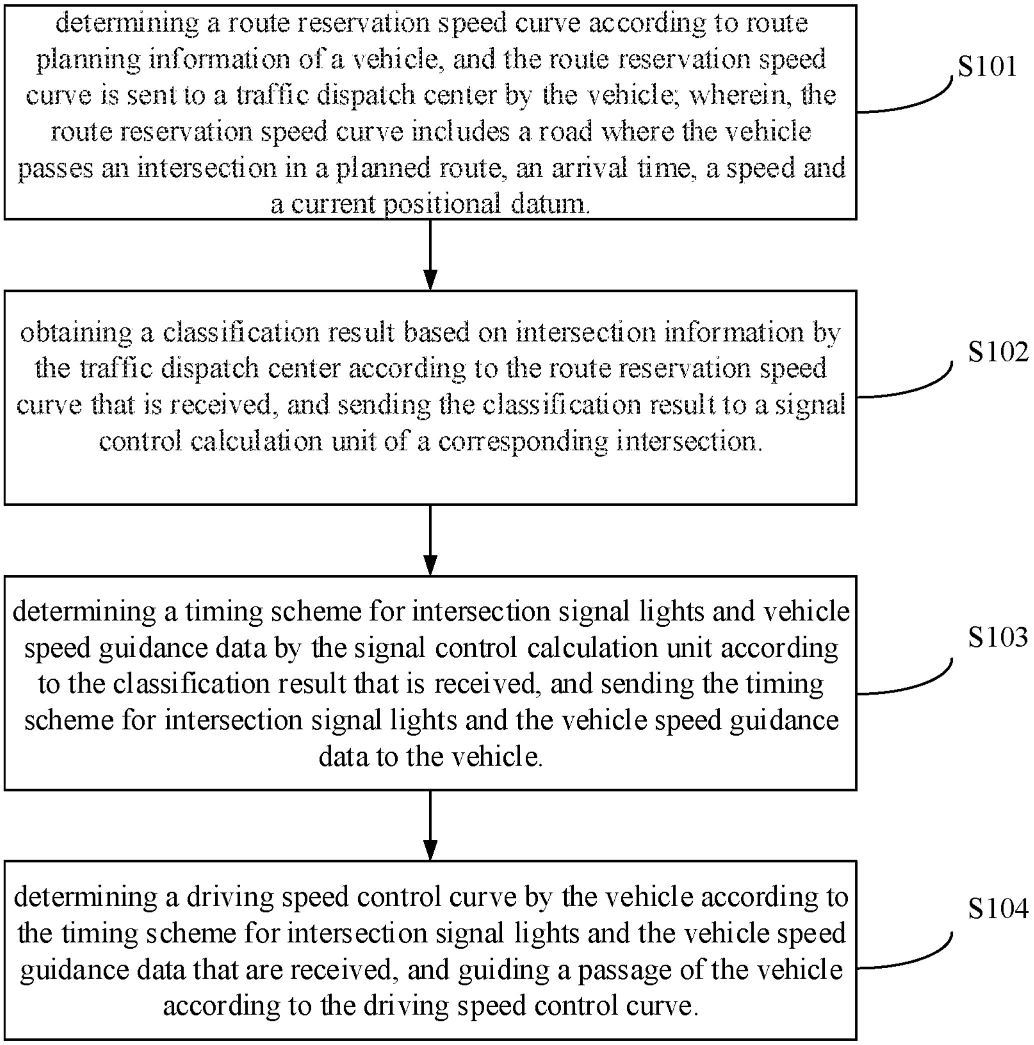
FIG. 1 shows a flowchart of a method for implementing road traffic reservation passage provided by Embodiment I of the present disclosure.

FIG. 1 shows a flowchart of a method for implementing road traffic reservation passage provided by an embodiment of the present disclosure, and the method includes the following steps.

Step S101: determining a route reservation speed curve according to route planning information of a vehicle, and the route reservation speed curve is sent to a traffic dispatch center by the vehicle, wherein the route reservation speed curve includes a lane where the vehicle passes an intersection in a planned route, an arrival time, a speed and a current positional datum.

The route planning refers to the result obtained by the vehicle terminal according to the data such as a departure place, a destination, a user type, habits, requirements, and a vehicle type. The route planning in the present embodiment is the route planning obtained by performing comprehensive calculations, optimizing the effect of the route planning to the greatest extent, which is required to consider, in the implementation process, the habitual route, the average vehicle speed of the user, additional requirements of the user such as temporary parking, passing through the user-defined halfway points, etc., as well as historical data and real-time data such as the average traffic speed of each lane section during the requesting period.

The route reservation speed curve includes a lane where the vehicle passes an intersection in a planned route, an arrival time, a speed, and a current positional datum. The route reservation speed curve is a datamation representation of the route planning, the lengths of each road in the route, the intersections passed through, the speed limits of each road or the average speed of the traffic on the road during the requested period, and also parameters such as the average speed of the vehicle, the departure time or the arrival time, etc., are included in the route reservation speed curve. The abscissa in the route reservation speed curve is the distance, and the ordinate is the speed. The corresponding route reservation speed curve is generated according to the time and the corresponding driving speeds of the vehicle when it is driven to each intersection acquired by the route planning information. The route reservation speed curve represents the desired driving state of the vehicle, and it can also be realized as the vehicle driving state in an ideal state.

It should be noted that, the route reservation speed curve is generated by the vehicle terminal, and the acquired real-time road information is transmitted and acquired through the corresponding data transmission module built in the vehicle. After the route reservation speed curve is acquired, the route reservation speed curve is sent to a traffic dispatch center by the vehicle. The process of sending can be regarded as the process of reservation, that is, the reservation requests related to the time of arrival at the intersections, the speeds of the vehicle at each time and the directions of driving in and driving out the intersections, etc., in the route reservation speed curve are uploaded to the traffic dispatch center by the vehicle. The traffic dispatch center can be regarded as a server terminal that is configured to perform related processing on the obtained reservation requests.

Step S102: obtaining a classification result by classifying based on intersection information by the traffic dispatch center according to the route reservation speed curve that is received, and sending the classification result to a signal control calculation unit of a corresponding intersection.

The route reservation speed curves of all vehicles will be received by the traffic dispatch center, that is, the obtained reservation requests of all vehicles are processed through the traffic dispatch center. At this time, the traffic dispatch center is regarded as the server terminal, all reservation requests are performed with classification and aggregation according to the intersection information and the obtained classification result is transmitted to the corresponding intersection control calculation unit.

Since the route reservation speed curve sent by the vehicle contains information on various roads and vehicles, the traffic dispatch center is required to separate all of the reservation requests and then perform aggregating on the data according to the intersections, that is, the classification result is obtained by performing disassembling according to the intersection information. The classification result contains the relevant reservation driving data of each of the vehicles and is configured for managing and controlling the reserved vehicles at the intersection, by sending the classification result to the signal control calculation unit of the corresponding intersection.

Step S103: determining a timing scheme for intersection signal lights and vehicle speed guidance data by the signal control calculation unit according to the classification result that is received, and sending the timing scheme for intersection signal lights and the vehicle speed guidance data to the vehicle.

The time data and spatial data related to the vehicle in the classification result is calculated by the signal control calculation unit, and the obtained calculation result is used to guide the vehicle to pass through the signal lights of the intersection. Specifically, the signal control calculation unit is a calculation module deployed in the cloud terminal or in the intersection signal machine, which performs overall planning and calculating to the vehicles on the road by receiving the classification result sent by the traffic dispatch center, to obtain the corresponding guidance scheme by taking the maximum passing efficiency of the system as a goal. Two types are contained in the guidance scheme, one is used to guide the vehicles, including the driving direction, the position and driving speed at each time, the allocated lane, the time of arriving at the intersection, and the speed of arriving at the intersection of each reserved vehicle; another type is used to guide all vehicles and pedestrians (including the vehicles without reservations) that passing through the intersection by the signal lights, that is, the most reasonable signal light timing scheme is generated in real-time in combination with the vehicle conditions on the road, so that the road passing efficiency is improved with the maximum extent. It should be noted that the time when the vehicle arrives at the intersection is mainly the time when the vehicle arrives at the intersection during the green light period, at this time, the driving speed of the vehicle arriving at the intersection is not zero, that is, the guidance to the driving process of the vehicle is realized. The obtained timing scheme for the intersection signal lights and the vehicle speed guidance data are required to be sent to the vehicle, which is configured for guiding the driving of the vehicle.

Step S104: determining a driving speed control curve by the vehicle according to the timing scheme for intersection signal lights and the vehicle speed guidance data that are received, and guiding a passage of the vehicle according to the driving speed control curve.

After the timing scheme for intersection signal lights and the vehicle speed guidance data are acquired, the vehicle is required to perform calculations to obtain the driving lane number for each of the intersections under the present driving route of the vehicle, the time of arriving at the intersection, the speed of arriving at the intersection and the signal light timing scheme when the vehicle arrives at the intersection, and the driving speed control curve is obtained through the data as mentioned above. The driving speed control curve is different from the route reservation speed curve; the route reservation speed curve can be regarded as input data, and the driving speed control curve can be regarded as output data.

The driving speed control curve can be displayed in a visual way, and the driving track and the state of the vehicle can be displayed in real time through marking the position and speed of the driving speed control curve on a map. In the specific implementation process, the driving speed control curve can be divided into a standard speed control curve and a real-time speed control curve. Herein, the standard speed control curve is essentially the speed planning curve for the entire route; the real-time speed control curve is the control curve generated by performing calculations to the remaining route according to the real-time data of the vehicle during the driving process of the vehicle. After the driving speed control curve is obtained, the passage of the vehicle is guided according to the data contained in the driving speed control curve.

It can be seen from the implementation method of road traffic reservation passage mentioned in the above embodiments that, during the implementation process of road traffic reservation passage, the requirement of each user is acquired accurately in a way of reservation, which can be planned in advance and accurately guided according to intersections and channelization directions of the intersections, the implementation process is reasonable and smooth, and the logic is strict, which can improve the control effect of the traffic signal control system, improve the passing efficiency of vehicles and reduce the waiting time when the vehicle, and it is conducive to reducing the energy consumption of the vehicle.

In some embodiments corresponding to the intersection terminal, the above method further includes:

sending the timing scheme for intersection signal lights to the signal machine of the corresponding intersection.

In the above embodiments, the timing scheme for intersection signal lights and the vehicle speed guidance data are sent to the vehicle. However, in the present embodiment, the timing scheme for intersection signal lights is sent to the signal machine of the corresponding intersection. Signal light durations of the intersection are controlled by the signal machine according to the timing scheme for intersection signal lights that is received, to guide the passages of all vehicles. The timing scheme is displayed through the signal lights of the corresponding intersection, so as to offer guidance to the vehicles on the road, realizing the reasonable passage of the vehicles and reducing the crowded situations as much as possible.

In some embodiments, determining of route reservation speed curve according to the route planning information of the vehicle as mentioned above includes the following steps:

a plurality of route planning schemes are determined according to the starting time, the departure place, and the destination of the vehicle, so as to obtain a route planning scheme that satisfies a preset condition from a plurality of the route planning schemes.

When the reservation is performed by the vehicle, a reservation request is required to be sent; at this time, the starting time, the departure place, and the destination of the requested reservation of the vehicle reservation can be directly obtained. The reservation request can be generated immediately from the vehicle terminal, it can be sent by the server terminal, and it can reserve a future moment and departure place. The reservation request can be sent from the vehicle terminal, and it can also be sent by the server terminal.

The route planning scheme that satisfies the preset condition is obtained from a plurality of the route planning schemes, and the time that the vehicle arrives at every intersection along the lane and the time that the vehicle arrives at the destination are obtained by calculating according to the route planning information of the route planning scheme.

After the departure place and the destination are obtained, a plurality of route planning schemes can be determined according to the practical demand. The obtaining of the route planning scheme is not necessarily the shortest and fastest, it is also required to be determined by combining the practical demand of the vehicle. For example, if another passenger is required to be picked up on a restricted lane, at this time, the vehicle is required to be controlled by combining the arrival time of the passenger, and the goal is to match the time when the vehicle is driven to a certain place at a constant speed with the arrival time of the passenger. Although the consumption time of the route is not necessarily the shortest, and the distance is not necessarily the shortest, the waiting time of the vehicle can be reduced as much as possible with such route planning, such that the waiting time of the vehicle is reduced, and the vehicle can be driven at a uniform speed as much as possible at the same time, which is also beneficial to reduce the energy consumption.

Therefore, on the premise of satisfying the preset condition, the best route planning scheme that satisfies the condition is obtained from a plurality of the route planning schemes. Since the route planning scheme is obtained, and the detailed data of the route planning are contained in the route planning scheme, the arrival time of the vehicle can be obtained by calculating according to the route planning information of the route planning scheme. It should be noted that, the arrival time is an expected value, which can be used for the practical speed induction or control only after calculation and distribution by the signal control calculation unit.

The time that the vehicle arrives at each intersection along the lane and the time that the vehicle arrives at the destination are obtained by calculating and the route reservation speed curve is generated according to, in the route planning information, the speed limit values between each of the intersections along the lane, the average vehicle speed between each of the intersections, the average driving speed of the vehicle, the starting time of the vehicle and the preset driving speed of the vehicle.

After the arrival time of the vehicle is obtained, the route reservation speed curve is finally generated by combining the speed limit values between each of the intersections, the average vehicle speed between each of the intersections, the average driving speed of the vehicle, and the starting time of the vehicle in the route planning information. The abscissa in the route reservation speed curve is the distance and the ordinate is the speed. The route reservation speed curve represents the expected driving state of the vehicle, and it can also be considered as the vehicle driving state in an ideal state.

In some embodiments, the above vehicle speed guidance data include: one or more of a departure place, a destination, a driving direction and a driving speed of the vehicle, positions at each time, information of the lane and arrival time at each intersection; different vehicles on the lane guidance data are required to satisfy the preset time intervals when they pass the same position. The vehicle speed guidance data in the above embodiments is the guidance data directed to each vehicle specifically. The guidance data can be roughly divided into two categories including driving data and road data, wherein the driving data represent the data used during the driving of the vehicle, such as the driving direction and driving speed of the vehicle, etc., and the road data represent the data of the occupied road during the driving of the vehicle, such as the information of the lane where the vehicle is located and the time of arrival at each intersection and so forth.

When different vehicles pass through the same location including the intersection of the same lane, a safe time interval must be provided to prevent competition or collision.

After the vehicle speed guidance data is sent to the vehicle terminal, the speed guidance or automatic driving control can be performed by the vehicle terminal.

In some embodiments, the step that the driving speed control curve is determined according to the timing scheme for intersection signal lights and the vehicle speed guidance data that are received by the vehicle includes that:

the timing scheme for intersection signal lights and the vehicle speed guidance data are received in real-time by the vehicle.

The timing scheme for intersection signal lights and the vehicle speed guidance data are obtained by the real-time data transmission between the vehicle terminal and the signal control calculation unit. At this time, the timing scheme for intersection signal lights and the vehicle speed guidance data are obtained by calculating through the signal control calculation unit provided at the intersection, therefore, the step is only for the process of transmission. The vehicle is required to maintain a long connection with the intersection when transmitting, or cyclically send the receiving request through a fixed time interval, so as to realize the process of receiving the above data in real-time by the vehicle.

The real-time planning information of the vehicle is determined through the timing scheme for intersection signal lights and the vehicle speed guidance data.

The real-time planning information includes the route planning data of the vehicle under the signal timing scheme of each intersection. It should be noted that the step is obtained by the vehicle terminal. The real-time planning information is all kinds of road information, navigation information and vehicle speed information contained in the current driving route of the vehicle.

The driving speed control curve is generated according to the current driving lane number of the vehicle, the time that the vehicle arrives at each intersection, the driving speeds that the vehicle arrives at each intersection and the signal light timing durations of each intersection in the real-time planning information.

The driving speed control curve is determined and obtained according to the current driving lane number of the vehicle, the time that the vehicle arrives at each intersection, the driving speeds that the vehicle arrives at each intersection and the signal light timing durations of each intersection in the real-time planning information. It is similar to the route reservation speed curve, the abscissa in the driving speed control curve is the distance and the ordinate is the speed. The driving speed control curve is different from the route reservation speed curve, the route reservation speed curve can be regarded as input data and the driving speed control curve can be regarded as output data.

In some embodiments, guiding the passage of the vehicle according to the driving speed control curve as mentioned above includes that:

the vehicle speed guidance data and the light timing scheme for the intersection passing through by the vehicle of each intersection in the driving speed control curve are obtained.

The vehicle speed guidance data and the light timing scheme for the intersection that the vehicle passes are input into the navigation system and/or automatic driving system of the vehicle, and the vehicle is controlled to drive according to the driving speed control curve.

After the road traffic reservation is completed, the final result obtained is required to be displayed to the driver by means of voice or image. Taking the driver as the subject, the driving speed control curve is obtained after performing the road traffic reservation request by the driver, the curve is sent to the vehicle as the guidance data, and is controlled by the display unit and the control unit in the vehicle. For example, if the vehicle is in automatic driving, the vehicle can be controlled to be driven according to the driving speed control curve; if the vehicle is not provided with a function of automatic driving, position display can be performed through the display unit provided in the vehicle, to guide the driver to drive; and if the function of the display unit of the vehicle is single, the driver can be guided to drive according to the voice.

In some embodiments, the practical driving process of the vehicle may be affected by various factors. For example, accidents happen on the road or temporary congestion happens; or in temporary scenarios such as the driver needs to update the reservation time temporarily and needs to arrive at the destination faster, after the driving speed control curve is determined, the method for implementing road traffic reservation passage further includes that:

the temporary result is obtained by performing recalculation on the driving speed control curve according to a preset time threshold.

The preset time threshold can be regarded as a refresh interval, that is, when the route planning is required to be performed again, it is required to be obtained through repeated refreshes through the time threshold. Specifically, during the implementation process of road traffic reservation passage, a driving speed control curve is always refreshed by the vehicle terminal according to the preset time threshold, that is, the remaining route is re-planned to obtain the temporary result when it is found that the reservation is required to be performed again.

The current driving speed control curve is maintained if the temporary result is consistent with the driving speed control curve; and the method for implementing road traffic reservation passage is re-executed according to the current position of the vehicle and the target position if the temporary result is not consistent with the driving speed control curve. This step is to compare the speed difference between the temporary result and the driving speed control curve at the same time.

Specifically, the temporary result is compared with the driving speed control curve, if the speed difference between the temporary result and the driving speed control curve does not exceed the preset threshold, the current driving speed control curve is maintained; if it exceeds the preset threshold, then the method for implementing road traffic reservation passage is re-executed according to the current position of the vehicle and the target position. It can be seen that this embodiment can be regarded as an implementation of reservation correction.

In some embodiments, the step that the timing scheme for intersection signal lights and the vehicle speed guidance data are determined according to the classification result that is received by the signal control calculation unit includes that:

the channelization information of the intersection corresponding to the signal control calculation unit is obtained.

The channelization information is the related road information generated after performing the channelization process to the road, which contains data information of facilities such as channelization lanes, channelization markings, safety islands or channelization intersections and so forth, which are specifically set to guide the traffic flow to pass in a designated direction. The channelization information contains detailed data of the road, such as the number of lanes, the direction of the lanes, the indication lines of each of the lanes and the lengths of the lanes, and also contains data such as non-motorized vehicle lanes and other signs or markings.

The channelization information of this step is divided according to the intersections, and the channelization information of the intersection corresponding to the signal control calculation unit is obtained.

The signal light timing scheme for the intersection is generated by calculating according to the channelization information of the intersection and reservation data of all vehicles at the intersection.

The time when the vehicle arrives at the intersection, the speed of the vehicle arrives at the intersection and the lane allocation result are determined according to the channelization information of the intersection, the signal light timing scheme for the intersection and reservation data of all vehicles, which are used as the vehicle speed guidance data.

After the channelization information is obtained, the time when the vehicle arrives at the intersection and the lane allocation result are determined through the route reservation speed curve of the vehicle in the classification result, which includes the following step that:

all requests in the classification result are grouped in sequence according to the drive-in direction of the vehicle, the drive-out direction of the vehicle and the time based on the channelization information, to obtain the grouping result.

In this step, a signal control calculation unit can be set which is configured for performing sequencing and grouping to all requests in the classification result according to the driving direction of the vehicle and time, to finally obtain the grouping result, which is configured to be used in subsequent steps. The goal of grouping is to perform sequencing process, the subsequent steps are required to be performed with related allocations sequentially according to the drive-in direction of the vehicle, the drive-out direction of the vehicle and the time.

The time that the vehicle arrives at the intersection is calculated according to the order in the grouping result, and the data is classified and aggregated according to the drive-in and drive-out directions, and the timing scheme for intersection signal lights is generated accordingly.

The time that the vehicle arrives at the intersection is calculated in real-time according to the order in the grouping result, and the timing scheme for intersection signal lights and the vehicle speed guidance data of the vehicle are updated. Specifically, the green light periods of each lane are determined according to the timing scheme for intersection signal lights, and it is evenly distributed nearby to the corresponding green light period of the lane with the direction according to the reservation information of the vehicles.

The time when the vehicle arrives at the conflict point is calculated in real-time by combining the order in the grouping result. For extending, the reservation time when the vehicle arrives at the conflict point is sequenced, and the reservation data is corrected and allocated according to the principle that the time when the vehicle arrives at the conflict point must satisfy the preset time threshold, and the guidance data is formed. When a vehicle behind the low-speed moving target needs to take the lane to overtake, the time when the vehicle arrives at the conflict point is calculated according to the principle of subtracting the same directional speed or adding an opposite directional speed.

The fixed conflict points and the mobile conflict points are contained in the conflict point, wherein the mobile conflict points are side-by-side regions on both sides of the lane where a low-speed vehicle is located and they move along with the low-speed vehicle; and the low-speed vehicle is a vehicle whose speed is lower than the average speed of the traffic flow on the lane where it is located. In a practical scenario, a low-speed moving target includes: road sprinklers, road sweepers, road construction vehicles, inspection vehicles or rescue vehicles and other vehicles whose speeds are lower than the average traffic flow speed on the road. When the vehicle behind the low-speed moving target needs to take the lane to overtake, the conflict point is at the parallel position on its side lane.

The above-mentioned low-speed moving target is a special road vehicle, including: road sprinklers, road sweepers, road construction vehicles, inspection vehicles or rescue vehicles. The special road vehicle usually refers to a vehicle for special purpose whose profile dimensions or weight exceed the design limits of vehicle, which is made or modified specially and equipped with fixed devices and equipment, and the main function of the special road vehicle is not to carry people or transport goods. The speed of the special road vehicle is relatively low in the road; therefore, this type of special road vehicles can be regarded as low-speed moving targets.

In some embodiments, the above-mentioned method is applied to the fixed conflict points and the mobile conflict points, wherein the fixed conflict points include one or more of: intersections with signal lights, intersections without signal lights, highway entrances and exits, urban expressway entrances and exits, overpass entrances and exits and conflux points.

In some embodiments, the process of the timing scheme for intersection signal lights and the vehicle guidance data are determined when the number of reserved vehicles reaches a passage capacity limit of the road includes that:

the road which reaches the passage capacity limit is identified and marked as a congested road section. By extension, the traffic control road section can be treated with reference to the embodiment of the congested road section as mentioned above.

When the number of reserved vehicles reaches the passage limit of the road at a certain time period, at this time, if a user makes a reservation, and the route planning information involved includes the road, it indicates that the road will be crowded at the reservation arrival time and the road section will be recorded as the congested road section at this time period.

The route planning information of the subsequent reserved vehicles are updated according to the principle of avoiding the congested road section.

At this time, the subsequent reserved vehicles will be prompted correspondingly, which indicates that the road section reaches or exceeds the transportation capacity. At this time, the route planning information of the vehicle will try to avoid passing through the road in this time period as much as possible, to achieve the purpose of avoiding the congestion. However, the finally obtained result is not necessarily to avoid the congestion, but to relatively select the route that is most suitable for the requirements of the user in all possible routes.

The timing scheme for intersection signal lights and the vehicle speed guidance data of the subsequent reserved vehicles are determined according to the route planning information that is updated.

The timing scheme for intersection signal lights and the vehicle speed guidance data for the new reserved vehicles are obtained after the route planning information is updated according to the principle of avoiding the congestion, and the vehicles are guided to drive.

In some embodiments, the steps that the driving speed control curve is determined according to the timing scheme for intersection signal lights and the vehicle speed guidance data that are received by the vehicle and the passage of the vehicle is guided according to the driving speed control curve includes that:

the standard speed control curve under the present driving route of the vehicle is generated according to the timing scheme for intersection signal lights and the driving lane numbers for each intersection, the time when the vehicle arrives at the intersection, the driving speed when the vehicle arrives at the intersection and the signal light timing scheme when the vehicle arrives at the intersection in the present driving route of the vehicle in the vehicle speed guidance data.

The driving speed control curve in the embodiment is divided into the standard speed control curve and the real-time speed control curve, wherein the standard speed control curve is essentially the speed planning curve of the entire route. The real-time speed control curve is the control curve generated by planning the remaining routes according to the real-time data of the vehicle during the driving process of the vehicle. This step is based on the data related to the timing scheme for intersection signal lights and the vehicle speed guidance data, that is, the driving lane numbers of each intersection, the time when the vehicle arrives at the intersection, the driving speed when the vehicle arrives at the intersection and the signal light timing scheme when the vehicle arrives at the intersection in the present driving route of the vehicle. The standard speed control curve under the present driving route of the vehicle is generated through the data as mentioned above.

During the driving process of the vehicle, the real-time speed control curve is started to be generated on the basis of the standard speed control curve, and is configured for adjusting the control error caused by control accuracy limitations or external disturbances in the practical driving process, and performing the required speed compensation.

The standard speed control curve and the real-time speed control curve are determined as the driving speed control curve; the vehicle is driven according to the real-time speed control curve when the speed value does not exceed the preset speed threshold, and the method for implementing road traffic reservation passage is re-executed according to the current time, speed, position and the target position of the vehicle when it exceeds the preset speed threshold.

The concepts of coordinate axis of the standard speed control curve and the real-time speed control curve are same, wherein the abscissa is the distance and the ordinate is the speed. The standard speed control curve and the real-time speed control curve are determined as the driving speed control curve and configured for representing the driving state of the vehicle.

In some embodiments, the vehicle is guided to pass according to the driving speed control curve as mentioned above, including:

in the display unit of the vehicle terminal, the icon of the current vehicle is simulated and displayed through the current position and the driving speed in the real-time speed control curve, and the icon is displayed in the electronic map to represent the current position of the vehicle; and an icon of a guiding vehicle that simulates driving according to the standard speed control curve is displayed at the same time, which is displayed in the same electronic map. The icons of two vehicles cannot be exactly the same. In generally, the icon of the current vehicle can be set as the normal icon, and the icon of the guiding vehicle can be a semi-transparent icon.

The driver of the vehicle decides to accelerate, decelerate or maintain the speed according to the relative position between the icon of the current vehicle and the icon of the guiding vehicle and the real-time speed control curve; and a sound or image prompting of accelerating, decelerating or maintaining the speed is also capable to be generated.

The method for implementing road traffic reservation passage is provided by the embodiments of the present disclosure, in which it can be known from the method that the route reservation speed curve is determined according to the route planning information of a vehicle; then, the route reservation speed curve is sent to a traffic dispatch center by the vehicle; a classification result is obtained by classifying based on intersection information by the traffic dispatch center according to the route reservation speed curve that is received, and the classification result is sent to a signal control calculation unit of a corresponding intersection; a timing scheme for intersection signal lights and vehicle speed guidance data are determined by the signal control calculation unit according to the classification result that is received, and the timing scheme for intersection signal lights and the vehicle speed guidance data are sent to the vehicle; and a driving speed control curve is determined by the vehicle according to the timing scheme for intersection signal lights and the vehicle speed guidance data that are received, and a passage of the vehicle is guided according to the driving speed control curve. In the implementation process of road traffic reservation passage, the requirement of each user is acquired accurately in a way of reservation, it can be planned in advance and accurately guided according to intersections and channelization directions of the intersections, thus the implementation process is reasonable and smooth, and the logic is strict, which can improve the control effect of the traffic signal control system, improve the passing efficiency of vehicles and reduce the waiting time of the vehicles, and it is conducive to reducing energy consumption.

Figure 2:
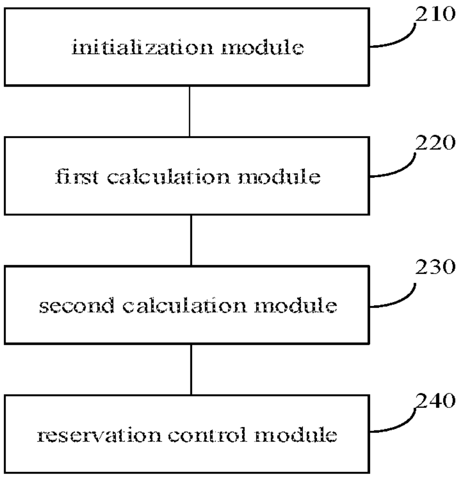
FIG. 2 shows a schematic structural diagram of a system for implementing road traffic reservation passage provided by Embodiment I of the present disclosure.

A system for implementing road traffic reservation passage is further provided by the embodiments of the present disclosure corresponding to the embodiments for the method as mentioned above, the schematic structural diagram of the system is shown as FIG. 2, including:

an initialization module 210, configured for determining a route reservation speed curve according to the route planning information of a vehicle, and the route reservation speed curve is sent to a traffic dispatch center by the vehicle, wherein the route reservation speed curve includes a lane where the vehicle passes an intersection in a planned route, an arrival time, a speed and a current positional datum;

a first calculation module 220, configured for obtaining a classification result by classifying based on intersection information by the traffic dispatch center according to the route reservation speed curve that is received, and sending the classification result to a signal control calculation unit of a corresponding intersection;

a second calculation module 230, configured for determining a timing scheme for intersection signal lights and vehicle speed guidance data by the signal control calculation unit according to the classification result that is received, and sending the timing scheme for intersection signal lights and the vehicle speed guidance data to the vehicle; and a reservation control module 240, configured for determining a driving speed control curve by the vehicle according to the timing scheme for intersection signal lights and the vehicle speed guidance data that are received, and guiding a passage of the vehicle according to the driving speed control curve.

In some embodiments, the system as mentioned above further includes:

a signal machine data receiving module, configured for sending the timing scheme for intersection signal lights to a signal machine of the corresponding intersection; and a signal machine controlling module, configured for controlling durations of the intersection signal lights by the signal machine according to the timing scheme for intersection signal lights that is received, to guide passages of all vehicles passing through the intersection.

In some embodiments, the initialization module as mentioned above further includes:

a route planning scheme determination module, configured for determining a plurality of route planning schemes according to a starting time, a departure place and a destination of the vehicle, obtaining a route planning scheme that satisfies a preset condition from a plurality of the route planning schemes; and a route reservation speed curve generation module, configured for obtaining the time that the vehicle arrives at every intersection along a lane and the time that the vehicle arrives at the destination by calculating, and generating the route reservation speed curve according to, in the route planning information, speed limit values between each of the intersections along the lane, an average vehicle speed between each of the intersections, the starting time of the vehicle and a preset driving speed of the vehicle.

In some embodiments, the vehicle speed guidance data includes: one or more of a departure place, a destination, a driving direction and a driving speed of the vehicle, positions at each time, information of the lane and time of arrival at each intersection; and different vehicles in lane guidance data are required to satisfy a preset time interval when passing through the same position.

In some embodiments, the reservation control module as mentioned above further includes:

a vehicle data receiving module, configured for real-time receiving the timing scheme for intersection signal lights and the vehicle speed guidance data by the vehicle;

a real-time planning information determination module, configured for determining real-time planning information of the vehicle according to the timing scheme for intersection signal lights and the vehicle speed guidance data, wherein the real-time planning information includes route planning data of the vehicle under signal light timing schemes at each intersection; and a driving speed control curve generation module, configured for generating the driving speed control curve according to the current driving lane number of the vehicle, the time that the vehicle arrives at each intersection, the driving speeds that the vehicle arrives at each intersection, and durations of the timing of signal lights at each intersection in the real-time planning information.

In some embodiments, the reservation control module as mentioned above further includes:

a driving speed control data acquisition module, configured for acquiring the vehicle speed guidance data at each intersection and light-timing schemes when the vehicle passes through each intersection in the driving speed control curve; and a driving control module, configured for inputting the vehicle speed guidance data and the light-timing schemes when the vehicle passes through intersections to a navigation system and/or an automatic driving system of the vehicle, and controlling the vehicle to drive according to the driving speed control curve.

In some embodiments, the system as mentioned above further includes:

a temporary result acquisition module, configured for performing a recalculation to the driving speed control curve according to a preset time threshold, to obtain a temporary result;

a temporary result determination module, configured for maintaining the current driving speed control curve when the temporary result is consistent with the driving speed control curve; and re-executing the method for implementing road traffic reservation passage according to a current position and a target position of the vehicle when the temporary result is not consistent with the driving speed control curve.

In some embodiments, the second calculation module as mentioned above further includes:

a channelization information acquisition module, configured for acquiring channelization information of an intersection corresponding to the signal control calculation unit;

a signal light timing scheme generation module, configured for generating a signal light timing scheme of the intersection by calculating according to the channelization information of the intersection and reservation data of all vehicles at the intersection; and a vehicle speed guidance data generation module, configured for determining the time that the vehicle arrives at the intersection, a speed, and a lane assignment result and using them as the vehicle speed guidance data according to the channelization information of the intersection, the signal light timing scheme of the intersection and the reservation data of all vehicles at the intersection.

In some embodiments, the vehicle speed guidance data generation module as mentioned above further includes:

a channelization information grouping module, configured for performing grouping in sequence to all requests in the classification result according to the driving directions of the vehicle and times, to obtain a grouping result according to the channelization information;

a signal light timing scheme generation module, configured for calculating the time that the vehicle arrives at the intersection according to the order in the classification result, performing classification and aggregation to the above data according to directions of driving in and driving out the intersection of the vehicle, and generating a timing scheme for the intersection signal lights accordingly; and a vehicle speed guidance data generation module, configured for determining green light periods of each lane according to the timing scheme for intersection signal lights, and distributing nearby uniformly the reservation information to the green light periods corresponding to lanes with the directions according to the reservation information of vehicles.

In some embodiments, the system as mentioned above is applied to fixed conflict points and mobile conflict points, wherein the fixed conflict points include one or more of: intersections with signal lights, intersections without signal lights, highway entrances and exits, urban expressway entrances and exits, overpass entrances and exits, and a conflux point; and the mobile conflict points are side-by-side regions on either side of a lane where a low-speed vehicle is located and they move along with the low-speed vehicles; and the low-speed vehicle is a vehicle whose speed is lower than the average speed of the traffic flow on the lane where it is located, and the time of arriving at the conflict points is calculated according to a principle of subtracting the same directional speed or adding an opposite directional speed.

In some embodiments, when the number of reserved vehicles reaches a passage capacity limit of a road, the above second calculation module further includes:

a congested road section marking module, configured for acquiring the road that reaches the passage capacity limit and recording it as a congested road section;

a route planning information updating module, configured for performing an updating of route planning information to subsequent reserved vehicles according to a principle of avoiding the congested road section; and a data updating module, configured for determining timing schemes for intersection signal lights and vehicle speed guidance data for the subsequent reserved vehicles according to the route planning information that is updated.

In some embodiments, the reservation control module as mentioned above further includes:

a standard speed control curve generation module, configured for generating a standard speed control curve under the present driving route of the vehicle according to the timing scheme for intersection signal lights and driving lane numbers of each intersection in the present driving route of the vehicle, times of arriving at the intersections, driving speeds of arriving at the intersections and signal light timing schemes when the vehicle arrives at the intersections in the vehicle speed guidance data;

a real-time speed control curve generation module, configured for generating a real-time speed control curve according to the standard speed control curve during the driving process of the vehicle, wherein the real-time speed control curve is configured for adjusting a control error caused by control accuracy limitations or external disturbances in a practical driving process, and performing a speed compensation that is required; and a driving speed control curve generation module, configured for determining the standard speed control curve and the real-time speed control curve as the driving speed control curve; driving according to the real-time control speed curve when a speed value of the real-time control speed curve does not exceed a preset speed threshold; and re-executing the method for implementing road traffic reservation passage according to the current time, speed, position, and the target position of the vehicle when it exceeds the preset speed threshold.

In some embodiments, the above reservation control module further includes:

a vehicle simulation and calculation module, configured for simulating and displaying an icon of a current vehicle according to the current position and the driving speed in the real-time speed control curve; and displaying an icon of a guiding vehicle that simulates driving according to the standard speed control curve at the same time; and a prompting module, configured for deciding to accelerate, decelerate or maintain the speed by the driver of the vehicle according to a relative position between the icon of the current vehicle and the icon of the guiding vehicle and the real-time speed control curve; and a sound or image prompting of accelerating, decelerating or maintaining the speed may also be generated.

The technical features in the system for implementing road traffic reservation passage provided by the embodiments of the present disclosure are the same as the technical features in the method for implementing road traffic reservation passage provided by the embodiments as mentioned above, therefore, the same technical problem can be solved and the same technical effect can be achieved. For a brief description, part of the contents that are not mentioned in the embodiment can be referred to the corresponding contents in the embodiments for the method as mentioned above.

Embodiment II

Figure 3:
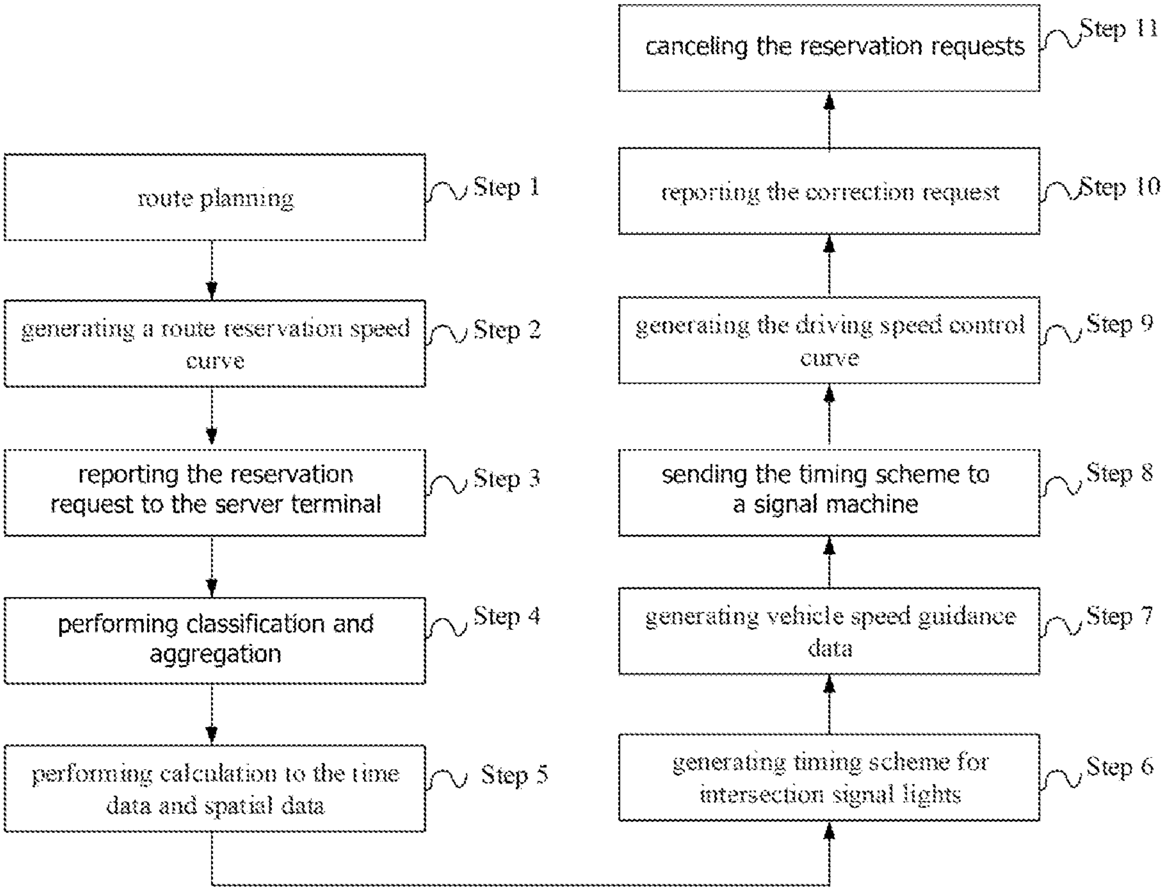
FIG. 3 shows a flowchart of another method for implementing road traffic reservation passage provided by Embodiment II of the present disclosure.

FIG. 3 shows a flowchart of another method for implementing road traffic reservation passage provided by an embodiment of the present disclosure, the method includes the following steps.

Step 1: route planning.

In step 1, a departure place, a destination, a departure time and an arrival time are determined before the route planning. Then, the route planning is performed by a vehicle terminal according to the departure place, the destination, a user type, habits, requirements, and a vehicle type. When planning, it is required to consider the user's habitual route and the requirements, average traffic speed of each road section during the requesting period, and the average speed recorded in the vehicle that the user drives, that is the user's habits, to perform route selection and optimization.

Step 2: generating a route reservation speed curve.

In step 2, the route reservation speed curve of the present driving process is generated by the vehicle terminal 1 according to factors such as the route planning, the speed limits involved in all roads in the route, the average traffic speed of the road during the requesting period, the average driving speed of the present vehicle, the departure time or the arrival time and so forth.

Step 3: reporting the reservation request to the server terminal.

Figure 4:
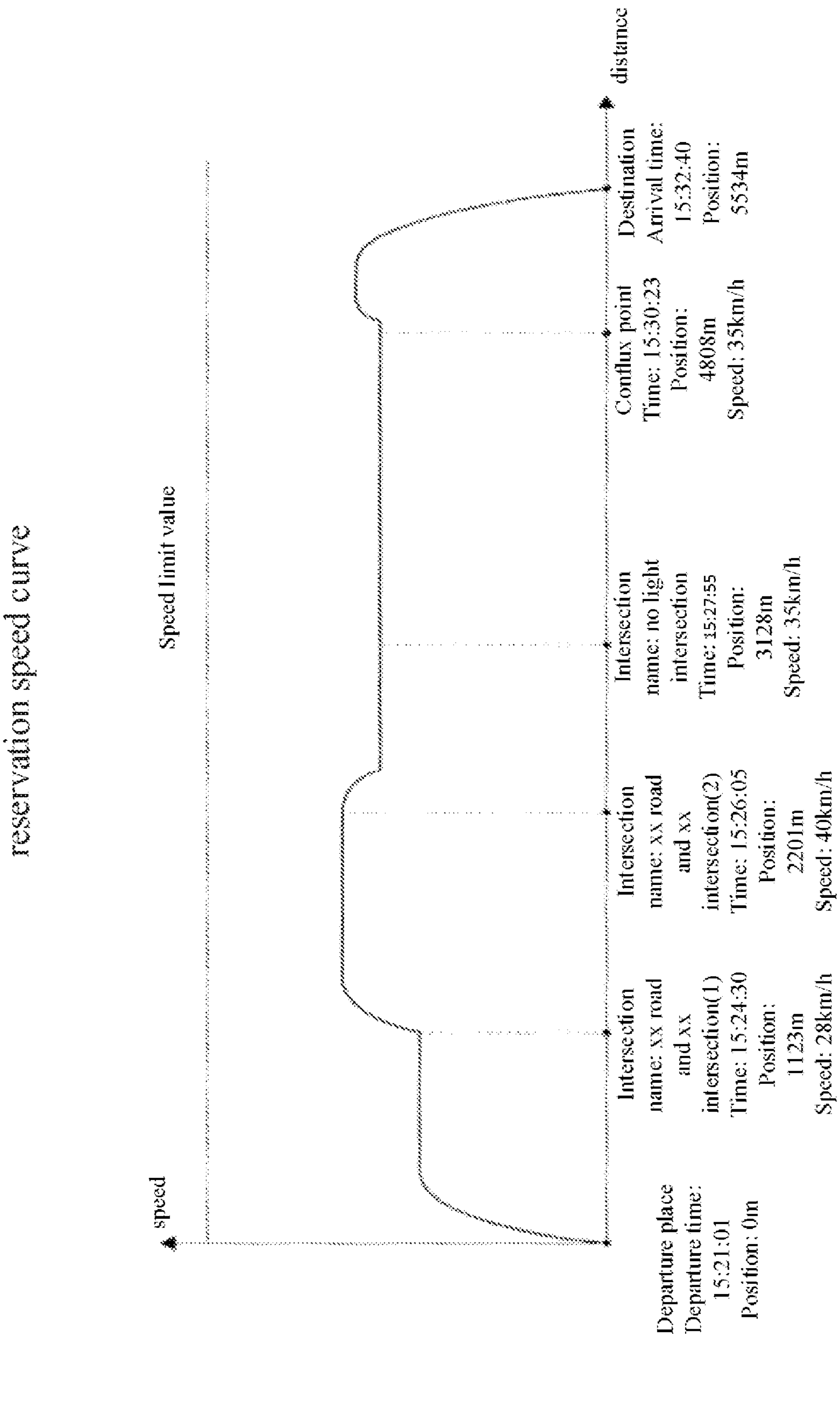
FIG. 4 shows a reservation speed curve diagram provided by Embodiment II of the present disclosure.

In step 3, the reservation request factors such as the time when the vehicle arrives at all intersections, the speed, the drive-in and drive-out directions of the intersections and so forth are generated and reported to the server terminal 2 by the vehicle terminal 1 according to the route reservation speed curve of the present driving generated in step 2. The reservation speed curve diagram generated in the present step is shown as FIG. 4, the abscissa is the distance which includes the road information of the vehicle between the departure place and the destination, and the ordinate is the speed which includes information such as the speed limit value, that is, the speed limit value cannot be exceeded when the vehicle is driven on the road.

Step 4: performing classification and aggregation to the requested data of each vehicle according to the intersections by the dispatch center 21, and forwarding it to the signal control calculation unit 22 of the corresponding intersection.

In step 4, the reservation requests from all vehicle terminals 1 are received by the dispatch center 21 of the server terminal 2, and the reservation requests of vehicle terminals 1 are divided and aggregated according to the intersections, and they are sent to the signal control calculation unit 22 corresponding to each of the intersections.

Step 5: performing calculation on the time data and spatial data by the signal control calculation unit 22.

In step 5, after the reservation requests of all vehicle terminals 1 of the present intersection are received by the signal control calculation unit 22, all of the requests are sequenced and grouped based on time according to the channelization information of the road, wherein the channelization information of the road includes information of going straight, turning left, turning right and turning around in each direction and types and number of the dedicated lanes. The intersections involved in the signal control calculation unit 22 do not only refer to intersections with signal lights; the fixed conflict points such as intersections without signal lights, highway entrances and exits, urban expressway entrances and exits, overpass entrances and exits or the conflux points, and mobile conflict points caused by low-speed moving targets can be controlled by referring to the method to the intersection as described; when a vehicle behind the low-speed moving target needs to take the lane to overtake, the conflict point is at the position parallel to its side lane and moves as following the low-speed moving target, and the time when the vehicle arrives at the conflict point is calculated according to the principle of subtracting the same directional speed or adding an opposite directional speed.

Step 6: generating timing scheme for intersection signal lights according to the data received from the signal control calculation unit 22.

In step 6, the timing schemes for intersection signal lights are generated by the signal light timing scheme generation module 23 according to the calculated result of the signal control calculation unit 22.

Step 7: generating vehicle speed guidance data according to the data from the signal control calculation unit 22.

In step 7, the calculated result of the signal control calculation unit 22 is output to the vehicle speed guidance data generation module 24, and the vehicle speed guidance data is generated, which includes the driving direction of each reserved vehicle, the positions of the vehicle at each time and its driving speed, the allocated lane, the time when the vehicle arrives at the intersection and the driving speed when the vehicle arrives at the intersection. The vehicle speed guidance data is sent to the vehicle terminal 1, so that the vehicle terminal 1 can perform speed guidance or automatic driving control. There must be a safe time interval when different vehicles passing through the same location including the intersection in the same lane.

Step 8: sending the timing scheme for intersection signal lights to a signal machine.

In step 8, the timing scheme for the intersection signal lights generated by the signal light timing scheme generation module 23 is sent to the signal machine 3, and the scheme is executed by the signal machine 3.

Step 9: sending the timing scheme for intersection signal lights and the vehicle speed guidance data to the vehicle terminal, and generating the driving speed control curve.

Figure 5:
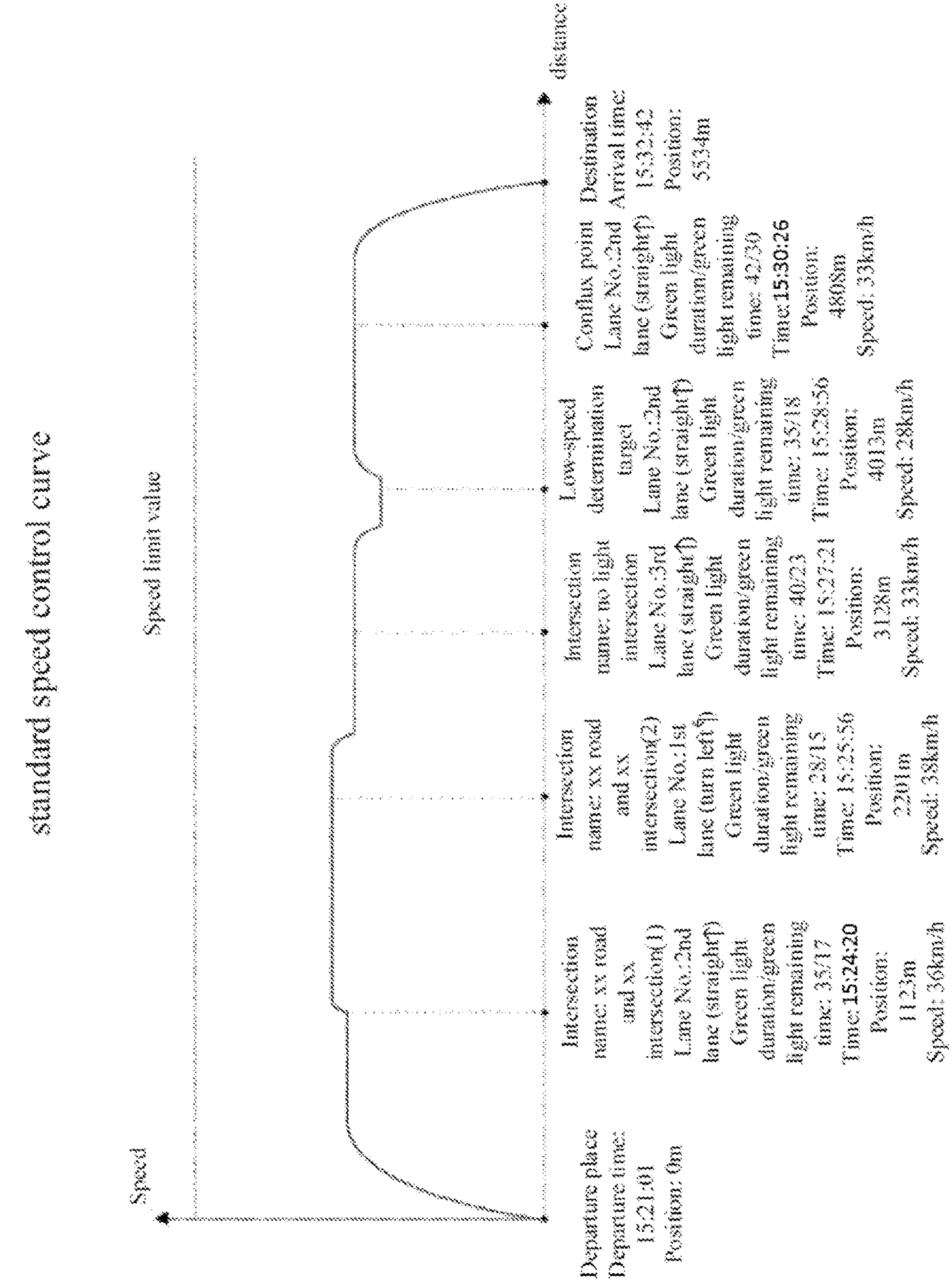
FIG. 5 shows a standard speed control curve diagram provided by Embodiment II of the present disclosure.
Figure 6:
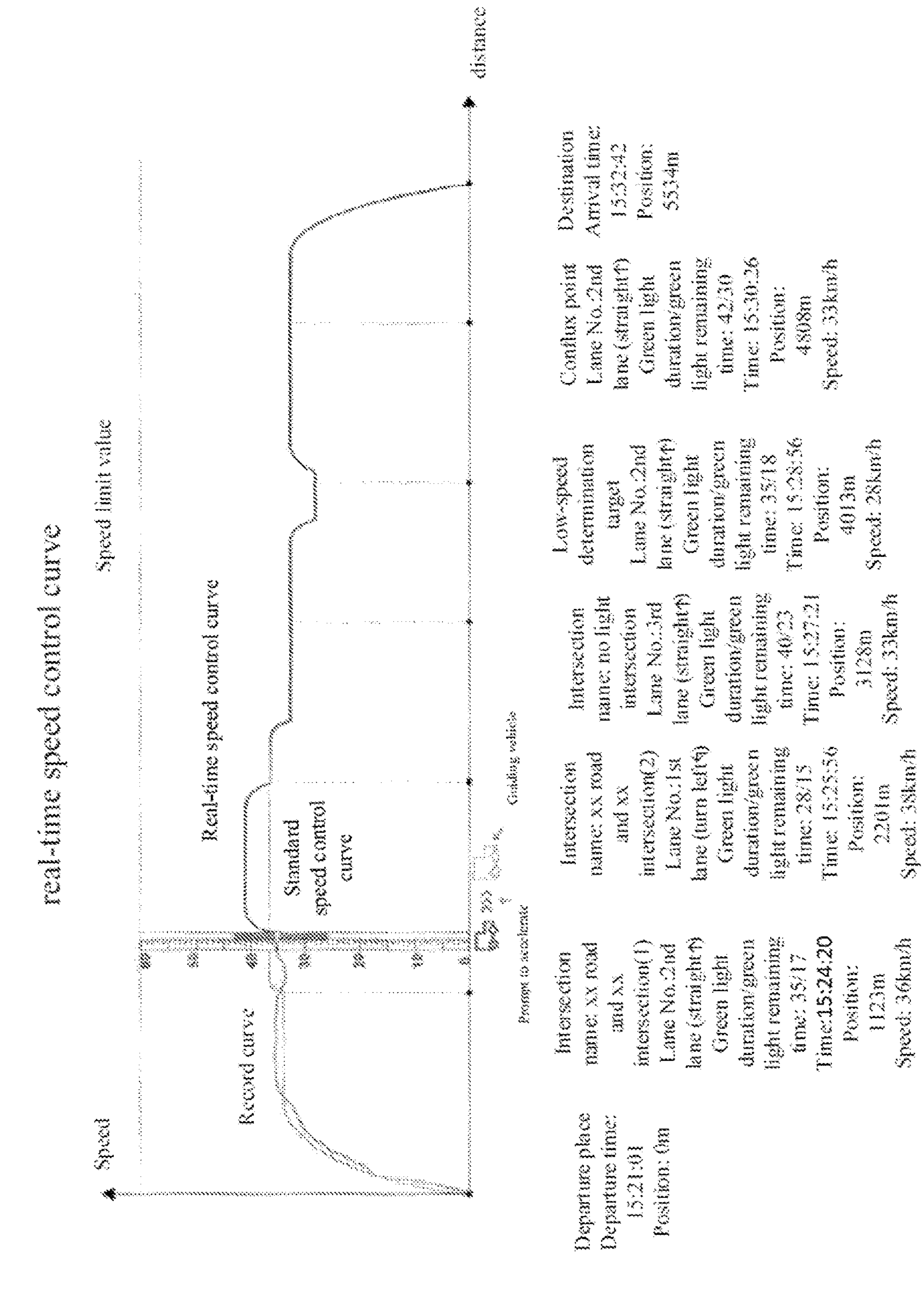
FIG. 6 shows a real-time speed control curve diagram provided by Embodiment II of the present disclosure.

In step 9 as mentioned above, the standard speed control curve of the present driving of the vehicle are generated by the vehicle terminal 1 according to the driving lane numbers at each intersection in the present driving route, the time when the vehicle arrives at the intersections, the driving speed when the vehicle arrives at the intersections and the signal light timing schemes when the vehicle arrives at the intersections given by the signal light timing scheme generation module 23 and the vehicle speed guidance data generation module 24 of the server terminal 2. The standard speed control curve is essentially the speed planning curve of the entire route and the standard speed control curve is shown in FIG. 5. The structure of the standard speed control curve is similar to that of the reservation speed curve, that is, the abscissa is the distance, which contains the road information between the departure place and the destination of the vehicle; the ordinate is the speed, which contains information such as the speed limit value, and the speed limit value cannot be exceeded when the vehicle is driven on the road. During the driving process of the vehicle, on the basis of the standard speed control curve, the real-time speed control curve of the remaining route is dynamically generated by taking the location where the vehicle is located, the time when the vehicle is located and the current speed as the starting point, and the real-time speed control curve is configured for adjusting a control error caused by control accuracy limitations or external disturbances in a practical driving process, and performing a speed compensation that is required. The diagram of the real-time speed control curve is shown as FIG. 6. It can be seen in FIG. 6, the standard speed control curve is a dotted line, and the real-time speed control curve is a solid line, and the speed difference can be obtained in the real-time speed control curve when a difference occurs between the standard speed control curve and the real-time speed control curve. Taking the figure as an example, when the speed of a certain road section in the real-time speed control curve exceeds the speed corresponding to the standard speed control curve, at this time, the vehicle is required to be prompted to accelerate, and the vehicle is guided to accelerate.

The standard speed control curve and the real-time speed control curve are also applicable to the speed control in automatic driving.

Step 10: reporting the correction request.

In step 10, the vehicle cannot be driven according to the original speed control curve through reasonable speed compensation due to various factors during the practical driving process such as accidents or congestions on the road, or the vehicle is required to increase the speed, change the route, change the destination or modify the arrival time when there is an urgent event, then the vehicle terminal 1 is required to be corrected by repeating the reservation process as mentioned above to the incomplete parts of the present driving;

and the present scheme may also repeat the reservation correction process according to the reserved route when the vehicle passing through an intersection for each time.

Step 11: canceling the reservation requests.

In step 11, the reservation requests that the vehicle cannot fully or partially complete the present driving due to various reasons which are required to perform reservation cancellation are reported to the server terminal 2 by the vehicle terminal 1 through the reservation cancellation request reporting module 16, and the unexecuted part of the original reservation requests is canceled by the server terminal 2.

It can be known from the method for implementing road traffic reservation passage provided by the embodiments of the present disclosure that the method can accurately obtain the requirements of users by the way of reservation, and plan in advance and guide the vehicle according to the intersections and the channelization direction of the intersections, the entire process is reasonable and smooth with the strict logic, and the safe, orderly, energy-saving and efficient traffic mode is realized.

Figure 7:
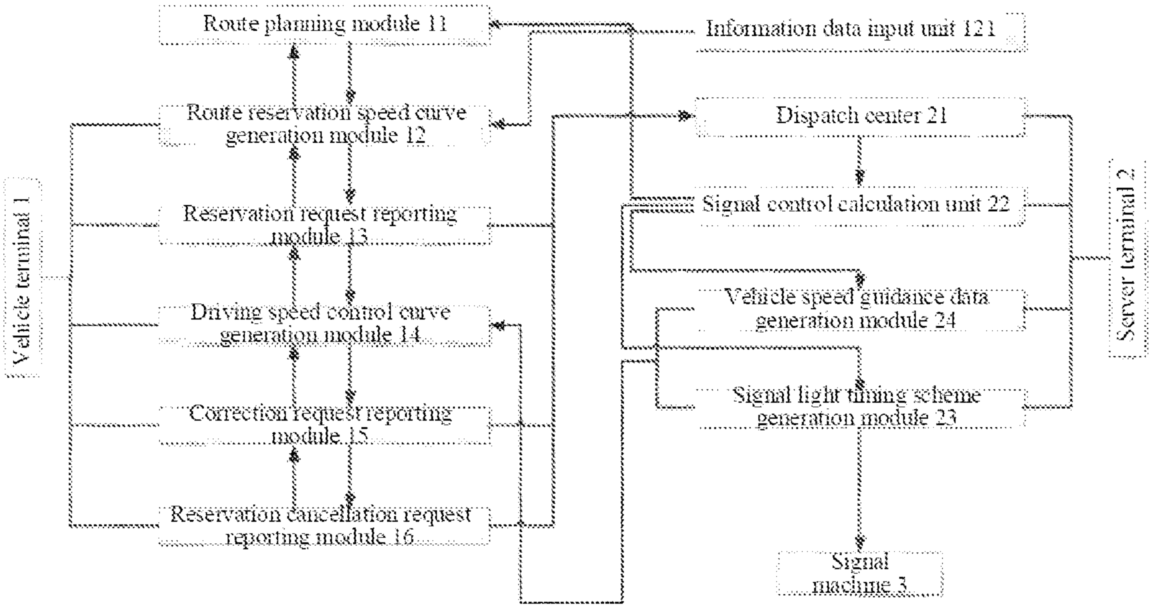
FIG. 7 shows a schematic structural diagram of another system for implementing road traffic reservation passage provided by Embodiment II of the present disclosure.

Another system for implementing road traffic reservation passage is provided by an embodiment of the present disclosure corresponding to the method embodiments as mentioned above, the schematic structural diagram of the system is shown in FIG. 7, which includes: a vehicle terminal 1 and a server terminal 2, wherein the vehicle terminal 1 includes a route planning module 11, a route reservation speed curve generation module 12, a reservation request reporting module 13, a driving speed control curve generation module 14, a correction request reporting module 15 and a reservation cancellation request reporting module 16, and the route planning module 11 is connected with the route reservation speed curve generation module 12 through signals. The route reservation speed curve generation module 12 includes an information data input unit 121, and the route reservation speed curve generation module 12 is connected with the reservation request reporting module 13 through signals, the vehicle terminal 1 is connected with the server terminal 2 through signals, and the server terminal 2 includes a dispatch center 21, a signal control calculation unit 22, a signal light timing scheme generation module 23 and a vehicle speed guidance data generation module 24. The dispatch center 21 is connected with the reservation request reporting module 13, the correction request reporting module 15 and the reservation cancellation request reporting module 16 through signals, the output terminal of the signal control calculation unit 22 is connected with the signal light timing scheme generation module 23 and the vehicle speed guidance data generation module 24 through signals, respectively. The output terminals of the driving speed control curve generation module 14 and the signal light timing scheme generation module 23 are connected with the output terminal of the vehicle speed guidance data generation module 24, and the input terminal of the signal control calculation unit 22 is connected with the output terminal of the dispatch center 21 through signals. The output terminals of the signal light timing scheme generation module 23 and the vehicle speed guidance data generation module 24 are connected with the vehicle terminal 1 through signals, and the output terminal of the signal light timing scheme generation module 23 is connected with the traffic signal machine 3.

The information data input unit 121 includes information data of the destination, the speed limits related to all roads in the route, the average driving speed on the roads, the average driving speed of the present vehicle, the departure time and the arrival time.

The route reservation speed curve generation module 12 and the reservation request reporting module 13 are connected with the correction request reporting module 15 and the reservation cancellation request reporting module 16 through signals.

According to the technical solutions as mentioned above, the signal control calculation unit 22 is a cloud computing unit, an edge computing unit or a built-in computing unit in the signal machine 3 of the corresponding intersection.

The system for implementing road traffic reservation passage provided by the embodiments of the present disclosure has the same technical features as the method for implementing road traffic reservation passage provided by the embodiments as mentioned above, so the same technical problems can be solved and the same technical effects can be achieved. For a brief description, part contents that are not mentioned in the embodiment can be referred to the corresponding contents in the embodiments for the method as mentioned above.

It is extendable that the present technical solution is also applicable to reservation passage control of river transportation, sea transportation or air transportation routes.

It is extendable that the present technical solution is also applicable to reservation passage control of convoys, fleets or aerial formations.

It is extendable that the present technical solution is also applicable to reservation passage control of special service vehicles, including public security police vehicles, fire trucks, ambulances or emergency rescue vehicles.

Embodiment III

Figure 8:
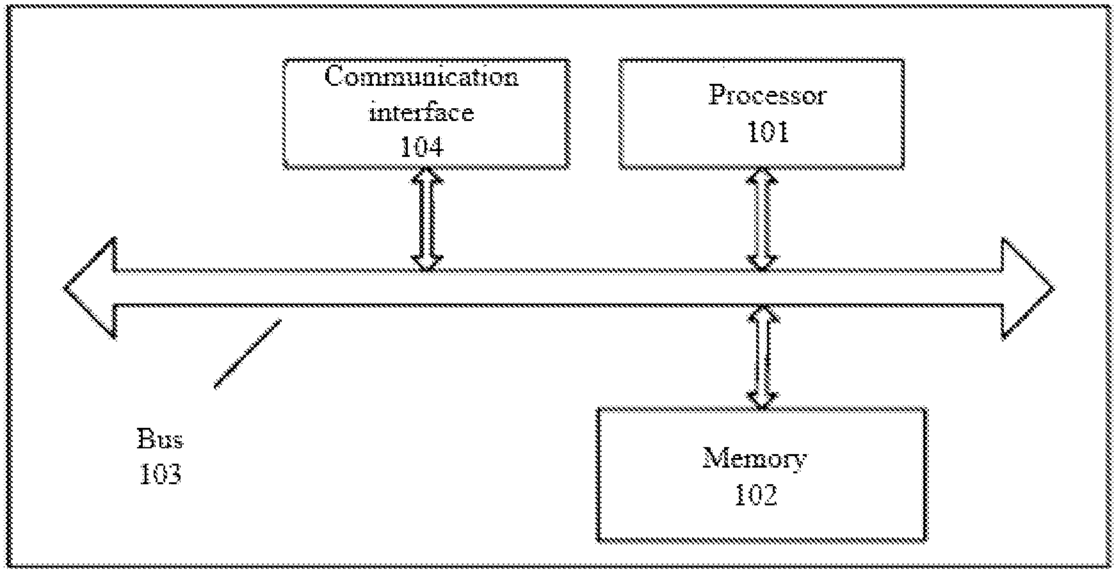
FIG. 8 shows a schematic diagram of an electronic device provided by an embodiment of the present disclosure.

The present disclosure further provides an electronic device, the schematic structural diagram of the electronic device is shown in FIG. 8, the device includes a processor 101 and a memory 102, wherein the memory 102 is configured for storing one or more computer instructions, when one or more computer instruction is executed by the processor, to implement the method for implementing road traffic reservation passage as mentioned above.

The electronic device as shown in FIG. 8 further includes a bus 103 and a communication interface 104, and the processor 101 and the communication interface 104 are connected with the memory 102 through the bus 103.

Herein, the memory 102 may include a high-speed random access memory (RAM), it may also include a non-volatile memory, such as at least one disk memory. The bus 103 may be an ISA bus, a PCI bus, an EISA bus and so forth. The bus can be divided into an address bus, a data bus, a control bus and so forth. For ease of presentation, only one bidirectional arrow is used in FIG. 8, but it does not mean that there is only one bus or one type of bus.

The communication interface 104 is configured to be connected with at least one user terminal and other network units through the network interface, such that the encapsulated IPv4 message or IPv4 message are sent to the user terminal through the network interface.

The processor 101 may be an integrated circuit chip with signal processing capability. In the implementation process, each step of the above-mentioned method may be completed by an integrated logic circuit of hardware or an instruction in the form of software in the processor 101. The aforementioned processor 101 may be a general-purpose processor, including a central processing unit (CPU for short), a network processor (NP for short), etc.; it may also be a digital signal processor (DSP for short), application specific integrated circuit (ASIC for short) or field-programmable gate array (FPGA for short) or other programmable logic devices, discrete gate or transistor logic devices or discrete hardware components. The disclosed methods, steps and logical block diagrams in the embodiments of the present disclosure can be implemented or executed. A general-purpose processor may be a microprocessor or the processor may be any conventional processor or the like. The steps of the methods disclosed in conjunction with the embodiments of the present disclosure may be directly embodied as executed by a hardware decoding processor, or executed by a combination of hardware and software modules in the decoding processor. The software modules may reside in random access memory, flash memory, read-only memory, programmable read-only memory, or electrically erasable programmable memory or registers, and other storage media mature in the art. The storage medium is located in the memory 102, and the processor 101 reads the information in the memory 102, and completes the steps of the methods of the foregoing embodiments in combination with its hardware.

The embodiments of the present disclosure further provide a computer-readable storage medium, a computer program is stored on the computer-readable storage medium, and when the computer program is run by a processor, the steps of the method of the foregoing embodiments are executed.

In the several embodiments provided in the present disclosure, it should be understood that the disclosed systems, devices and methods may be implemented in other manners. The device embodiments described above are only illustrative. For example, the division of the units is only a logical function division. In practical implementation, there may be other division methods. For example, multiple units or components may be combined or can be integrated into another system, or some features can be ignored, or not implemented. On the other hand, the shown or discussed mutual coupling or direct coupling or communication connection may be indirect coupling or communication connection through some communication interfaces, devices or units, which may be in electrical, mechanical or other forms.

The units described as separate components may or may not be physically separated, and components displayed as units may or may not be physical units, that is, they may be located in one place, or may be distributed to multiple network units. Some or all of the units may be selected according to practical needs to achieve the purpose of the solution in the present embodiment.

In addition, each functional unit in each embodiment of the present disclosure may be integrated into one processing unit, or each unit may exist physically alone, or two or more units may be integrated into one unit.

When the functions are implemented in the form of software functional units and sold or used as stand-alone products, they can be stored in a processor-executable non-volatile computer-readable storage medium. Based on this understanding, the technical solutions of the present disclosure can be represented in the form of software products in essence, or the parts that make contributions to the prior art or the parts of the technical solutions can be represented in the form of software products. The computer software products are stored in a storage medium, including several instructions to cause a computer device, which may be a personal computer, a server, or a network device, to execute all or part of the steps of the methods described in the various embodiments of the present disclosure. The aforementioned storage medium includes: U disk, mobile hard disk, read-only memory (ROM), random access memory (RAM), magnetic disk, optical disk or other media that can store program codes.

Finally, it should be noted that the embodiments as mentioned above are only specific implementations of the present disclosure, and are used to illustrate the technical solutions of the present disclosure rather than limiting them. The protection scope of the present disclosure is not limited thereto, although referring to the foregoing embodiments, they describe the present disclosure in detail, and those skilled in the art should understand that: within the technical scope disclosed by the present disclosure, any person skilled in the art can still modify the technical solutions described in the foregoing embodiments, or can easily think of changes, or equivalently replace some of the technical features; and these modifications, changes or replacements do not make the essence of the corresponding technical solutions deviate from the spirit and scope of the technical solutions of the embodiments of the present disclosure, and should be covered in the scope of protection of the present disclosure. Therefore, the protection scope of the present disclosure should be based on the protection scope of the claims.

What is claimed is:

1. A method for implementing road traffic reservation passage, wherein the method comprises:

determining a route reservation speed curve according to route planning information of a vehicle, wherein the route reservation speed curve is sent to a traffic dispatch center by the vehicle, wherein the route reservation speed curve comprises a lane where the vehicle passes an intersection in a planned route, an arrival time, a speed and a current positional datum;

obtaining a classification result by classifying based on intersection information by the traffic dispatch center according to the route reservation speed curve that is received, and sending the classification result to a signal control calculation unit of a corresponding intersection;

determining a timing scheme for intersection signal lights and vehicle speed guidance data by the signal control calculation unit according to the classification result that is received, and sending the timing scheme for intersection signal lights and the vehicle speed guidance data to the vehicle; and determining a driving speed control curve by the vehicle according to the timing scheme for intersection signal lights and the vehicle speed guidance data that are received, and guiding a passage of the vehicle according to the driving speed control curve.

2. The method for implementing road traffic reservation passage according to claim 1, wherein the method further comprises:

sending the timing scheme for intersection signal lights to a signal machine of the corresponding intersection; and controlling durations of the intersection signal lights by the signal machine according to the timing scheme for intersection signal lights that is received, to guide passages of all vehicles passing through the intersection.

3. The method for implementing road traffic reservation passage according to claim 1, wherein determining a route reservation speed curve according to route planning information of a vehicle comprises:

determining a plurality of route planning schemes according to a starting time, a departure place and a destination of the vehicle, and obtaining a route planning scheme that satisfies a preset condition from a plurality of the route planning schemes; and obtaining a time that the vehicle arrives at every intersection along a lane and the time that the vehicle arrives at the destination by calculating, and generating the route reservation speed curve according to, in the route planning information, speed limit values between each of intersections along the lane, an average vehicle speed between each of the intersections along the lane, the starting time of the vehicle and a preset driving speed of the vehicle.

4. The method for implementing road traffic reservation passage according to claim 1, wherein the vehicle speed guidance data comprises: one or more of a departure place, a destination, a driving direction and a driving speed of the vehicle, positions at each time, information of the lane and time of arrival at each intersection; and different vehicles in lane guidance data are required to satisfy a preset time interval when passing through a same position.

5. The method for implementing road traffic reservation passage according to claim 1, wherein the determining a driving speed control curve by the vehicle according to the timing scheme for intersection signal lights and the vehicle speed guidance data that are received comprises:

real-time receiving the timing scheme for intersection signal lights and the vehicle speed guidance data by the vehicle;

determining real-time planning information of the vehicle according to the timing scheme for intersection signal lights and the vehicle speed guidance data, wherein the real-time planning information comprises route planning data of the vehicle under timing schemes at each intersection; and generating the driving speed control curve according to a current driving lane number of the vehicle, a the time that the vehicle arrives at each intersection, driving speeds that the vehicle arrives at each intersection and durations of timing of signal lights at each intersection in the real-time planning information.

6. The method for implementing road traffic reservation passage according to claim 1, wherein the guiding a passage of the vehicle according to the driving speed control curve comprises:

acquiring vehicle speed guidance data at each intersection and light-timing schemes when the vehicle passes through each intersection in the driving speed control curve; and inputting the vehicle speed guidance data and the light-timing schemes when the vehicle passes through each intersection to a navigation system and/or an automatic driving system of the vehicle, and controlling the vehicle to drive according to the driving speed control curve.

7. The method for implementing road traffic reservation passage according to claim 1, wherein after determining the driving speed control curve, the method further comprises:

performing a recalculation to the driving speed control curve according to a preset time threshold, to obtain a temporary result;

maintaining a current driving speed control curve when the temporary result is consistent with the driving speed control curve; and re-executing the method for implementing road traffic reservation passage according to a current position and a target position of the vehicle when the temporary result is not consistent with the driving speed control curve.

8. The method for implementing road traffic reservation passage according to claim 1, wherein the determining a timing scheme for intersection signal lights and vehicle speed guidance data by the signal control calculation unit according to the classification result that is received comprises:

acquiring channelization information of an intersection corresponding to the signal control calculation unit;

generating a signal light timing scheme of the intersection by calculating according to the channelization information of the intersection and reservation data of all vehicles at the intersection; and determining a time that the vehicle arrives at the intersection, a speed and a lane assignment result and using them as the vehicle speed guidance data according to the channelization information of the intersection, the signal light timing scheme of the intersection and the reservation data of all vehicles at the intersection.

9. The method for implementing road traffic reservation passage according to claim 8, wherein the determining a time that the vehicle arrives at the intersection, a speed and a lane assignment result and using them as the vehicle speed guidance data according to the channelization information of the intersection, the signal light timing scheme of the intersection and the reservation data of all vehicles at the intersection comprises:

performing grouping in sequence to all requests in the classification result according to driving directions of the vehicles and times, to obtain a grouping result according to the channelization information;

calculating a time that the vehicle arrives at the intersection according to a sequence order in the classification result, performing classification and aggregation to the above data according to directions of driving in and driving out the intersection of the vehicle, and generating the timing scheme for intersection signal lights accordingly; and determining green light periods of each lane according to the timing scheme for intersection signal lights, and distributing uniformly the reservation information to green light periods corresponding to lanes with the directions nearby according to the reservation information of vehicles.

10. The method for implementing road traffic reservation passage according to claim 8, wherein a process of determining the timing scheme for intersection signal lights and the vehicle speed guidance data when the number of reserved vehicles reaches a passage capacity limit of a road comprises:

acquiring a road that reaches the passage capacity limit and recording the road as a congested road section;

performing an updating of route planning information to subsequent reserved vehicles according to a principle of avoiding the congested road section; and determining timing schemes for intersection signal lights and vehicle speed guidance data for the subsequent reserved vehicles according to the route planning information that is updated.

11. The method for implementing road traffic reservation passage according to claim 1, wherein the method is applied to fixed conflict points and mobile conflict points, wherein the fixed conflict points comprise one or more of: intersections with signal lights, intersections without signal lights, highway entrances and exits, urban expressway entrances and exits, overpass entrances and exits and a conflux point;

the mobile conflict points are side-by-side regions on either side of a lane where a low-speed vehicle is located and they move along with the low-speed vehicles; and the low-speed vehicle is a vehicle whose speed is lower than an average speed of a traffic flow on the lane where the vehicle is located, and a time of arriving the conflict points is calculated according to a principle of subtracting a same directional speed or adding an opposite directional speed.

12. The method for implementing road traffic reservation passage according to claim 1, wherein the step of determining a driving speed control curve by the vehicle according to the timing scheme for intersection signal lights and the vehicle speed guidance data that are received, and guiding a passage of the vehicle according to the driving speed control curve comprises:

generating a standard speed control curve under a present driving route of the vehicle according to the timing scheme for intersection signal lights and driving lane numbers of each intersection in the present driving route of the vehicle, times of arriving at intersections, driving speeds of arriving at the intersections and signal light timing schemes when the vehicle arrives at the intersections in the vehicle speed guidance data;

generating a real-time speed control curve according to the standard speed control curve during a driving process of the vehicle, wherein the real-time speed control curve is configured for adjusting a control error caused by control accuracy limitations or external disturbances in a practical driving process, and performing a speed compensation that is required; and determining the standard speed control curve and the real-time speed control curve as the driving speed control curve; driving according to the real-time control speed curve when a speed value of the real-time control speed curve does not exceed a preset speed threshold; and re-executing the method for implementing road traffic reservation passage according to a current time, speed, position and a target position of the vehicle when exceeding the preset speed threshold.

13. The method for implementing road traffic reservation passage according to claim 12, wherein the guiding a passage of the vehicle according to the driving speed control curve comprises:

simulating and displaying an icon of a current vehicle by the vehicle according to a current position and a driving speed in the real-time speed control curve; displaying an icon of a guiding vehicle that simulates driving according to the standard speed control curve at the same time;

deciding to accelerate, decelerate or maintain a speed by a driver of the vehicle according to a relative position between the icon of the current vehicle and the icon of the guiding vehicle and the real-time speed control curve; and a sound or image prompting of accelerating, decelerating or maintaining the speed is also capable to be generated.

14. An electronic device, wherein the electronic device comprises: a processor and a storage apparatus; a computer program is stored on the storage apparatus, and when the computer program is run by the processor, steps of the method for implementing road traffic reservation passage claim 1 are executed.

15. A system for implementing road traffic reservation passage, wherein the system comprises:

an initialization module, configured for determining a route reservation speed curve according to route planning information of a vehicle, wherein the route reservation speed curve is sent to a traffic dispatch center by the vehicle, wherein the route reservation speed curve comprises a lane where the vehicle passes an intersection in a planned route, an arrival time, a speed and a current positional datum;

a first calculation module, configured for obtaining a classification result by classifying based on intersection information by the traffic dispatch center according to the route reservation speed curve that is received, and sending the classification result to a signal control calculation unit of a corresponding intersection;

a second calculation module, configured for determining a timing scheme for intersection signal lights and vehicle speed guidance data by the signal control calculation unit according to the classification result that is received, and sending the timing scheme for intersection signal lights and the vehicle speed guidance data to the vehicle; and a reservation control module, configured for determining a driving speed control curve by the vehicle according to the timing scheme for intersection signal lights and the vehicle speed guidance data that are received, and guiding a passage of the vehicle according to the driving speed control curve.

* * * * *